(12) United States Patent
Terrell

(10) Patent No.: US 11,382,279 B2
(45) Date of Patent: Jul. 12, 2022

(54) APPARATUS FOR AERIAL TOOL CONFIGURATIONS

(71) Applicant: Steven J Terrell, Hemphill, TX (US)

(72) Inventor: Steven J Terrell, Hemphill, TX (US)

( * ) Notice: Subject to any disclaimer, the term of this patent is extended or adjusted under 35 U.S.C. 154(b) by 381 days.

(21) Appl. No.: 16/422,806

(22) Filed: May 24, 2019

(65) Prior Publication Data

US 2019/0327903 A1    Oct. 31, 2019

Related U.S. Application Data

(63) Continuation-in-part of application No. 15/070,293, filed on Mar. 15, 2016, now Pat. No. 10,299,440, (Continued)

(51) Int. Cl.
*A01G 23/087*    (2006.01)
*A01G 3/08*    (2006.01)
(Continued)

(52) U.S. Cl.
CPC ........... *A01G 3/088* (2013.01); *A01G 23/087* (2013.01); *A01G 23/091* (2013.01); *A01G 23/095* (2013.01)

(58) Field of Classification Search
CPC .... A01G 23/08; A01G 23/083; A01G 23/087; A01G 23/091; A01G 23/093; A01G 23/095

See application file for complete search history.

(56) References Cited

U.S. PATENT DOCUMENTS

| 1,364,432 A | 1/1921 | Georgelis |
| 2,538,371 A | 10/1946 | Tourneau |
| (Continued) | | |

FOREIGN PATENT DOCUMENTS

| WO | 9304574 B1 | 3/1993 |
| WO | 2011078673 A1 | 6/2011 |

OTHER PUBLICATIONS

PCT Notification of Transmittal of International Search Report and The Written Opinion of the International Searching Authority dated Nov. 28, 2012, issued from the International Searching Authority in related PCT Application No. PCT/US2012/036309 (9 pages).
(Continued)

*Primary Examiner* — Matthew Katcoff
(74) *Attorney, Agent, or Firm* — Nolte Lackenbach Siegel

(57) ABSTRACT

A field-configurable apparatus for different aerial applications is provided. The field-configurable apparatus attaches to an aerial boom on a mobile carrier. The apparatus can perform rapid semi-precise cutting of vegetation. Additionally, the apparatus can perform more precise trimming of one or more areas (e.g., limbs) and optionally use a limb clamp to prevent cut limbs/vegetation from arbitrarily falling on objects below the cutting area. Still further, the apparatus can have a grapple or similar device attached to the end of the boom for use in relocating debris or for loading debris. Other industrial applications are also possible (e.g., commercial water blasting, deicing of planes, etc.). In each configuration, the apparatus comprises one or more rotatable or pivoting couplings to allow for rotation about one or more axis and therefore allow precise manipulation of an aerial tool assembly from an operator in the vehicle or on the ground.

18 Claims, 31 Drawing Sheets

Related U.S. Application Data which is a continuation of application No. 13/441,377, filed on Apr. 6, 2012, now Pat. No. 9,307,704.

(60) Provisional application No. 61/482,807, filed on May 5, 2011.

(51) Int. Cl.
*A01G 23/095* (2006.01)
*A01G 23/091* (2006.01)

(56) References Cited

U.S. PATENT DOCUMENTS

| | | | |
|---|---|---|---|
| 2,663,952 A | 12/1953 | Winget |
| 2,878,633 A | 3/1959 | Mullin |
| 3,017,121 A | 1/1962 | Carlson |
| 3,183,949 A | 5/1965 | Larson |
| 3,234,976 A | 2/1966 | Grant |
| 3,252,487 A | 5/1966 | Larson |
| 3,343,575 A | 9/1967 | Trout |
| 3,389,728 A | 6/1968 | Galis |
| 3,443,611 A | 5/1969 | Jorgensen |
| 3,448,518 A | 6/1969 | Sklar |
| 3,461,928 A | 8/1969 | Siiro |
| 3,468,352 A | 9/1969 | Larson |
| 3,529,642 A | 9/1970 | Kamner |
| 3,565,372 A | 2/1971 | Jones et al. |
| 3,664,391 A | 5/1972 | Coffey |
| 3,675,691 A | 7/1972 | Denovan et al. |
| 3,688,816 A | 9/1972 | Runeson |
| 3,720,246 A | 3/1973 | David |
| 3,763,905 A | 10/1973 | Hamilton et al. |
| 3,857,176 A | 12/1974 | Quenot |
| 3,974,866 A | 8/1976 | Saarenketo |
| 3,991,799 A | 11/1976 | Albright |
| 4,050,488 A | 9/1977 | Albright |
| 4,063,359 A | 12/1977 | Luscombe |
| 4,269,241 A | 5/1981 | Hickman |
| 4,291,492 A | 9/1981 | Reynolds et al. |
| 4,522,239 A | 6/1985 | Gaitten |
| 4,569,379 A | 2/1986 | Gemmell-Murdoch |
| 4,926,622 A | 5/1990 | McKee |
| 5,050,303 A | 9/1991 | Sinclair et al. |
| 5,143,131 A | 9/1992 | Seigneur et al. |
| 5,220,773 A | 6/1993 | Klaeger |
| 5,318,081 A | 6/1994 | Parkhurst |
| 5,329,752 A | 7/1994 | Milbourn |
| 5,378,852 A | 1/1995 | Manor |
| 5,390,715 A | 2/1995 | Luscombe |
| 5,426,854 A | 6/1995 | Leini et al. |
| 5,441,090 A | 8/1995 | Hill et al. |
| 5,501,257 A | 3/1996 | Hickman |
| 5,502,896 A | 4/1996 | Chen |
| 5,503,201 A | 4/1996 | Stickland et al. |
| 5,987,862 A | 11/1999 | Long et al. |
| 6,125,621 A | 10/2000 | Burch |
| 6,311,746 B1 | 11/2001 | Halvorson et al. |
| 6,314,646 B1 | 11/2001 | Schmidt |
| 6,408,906 B1 | 6/2002 | Moon |
| 6,439,279 B1 | 8/2002 | Underwood |
| 6,497,088 B1 | 12/2002 | Holley |
| 6,510,612 B1 | 1/2003 | Cybulski |
| 6,533,527 B1 * | 3/2003 | Inoue | E02F 3/3622 414/686 |
| 6,643,933 B2 | 11/2003 | Seigneur |
| 6,745,474 B1 | 6/2004 | Huang |
| 6,779,570 B2 * | 8/2004 | Tardif | A01G 23/003 100/100 |
| 6,886,256 B2 | 5/2005 | Hobday |
| 6,990,770 B2 | 1/2006 | Terrell |
| 7,284,718 B2 | 10/2007 | Christenson |
| 7,767,430 B2 | 8/2010 | Neeser et al. |
| 7,882,864 B2 | 2/2011 | Fargeot |
| 7,934,524 B2 | 5/2011 | Priebe |
| 9,307,704 B2 | 4/2016 | Terrell |
| 10,299,440 B2 | 5/2019 | Terrell |
| 2008/0271817 A1 * | 11/2008 | Priebe | B27L 7/06 144/195.1 |

OTHER PUBLICATIONS

Parker Hannifin Corporation, "Instrumentation Quick Coupling Products" Catalog 422/USA, pp. 51, Apr. 2008.

* cited by examiner

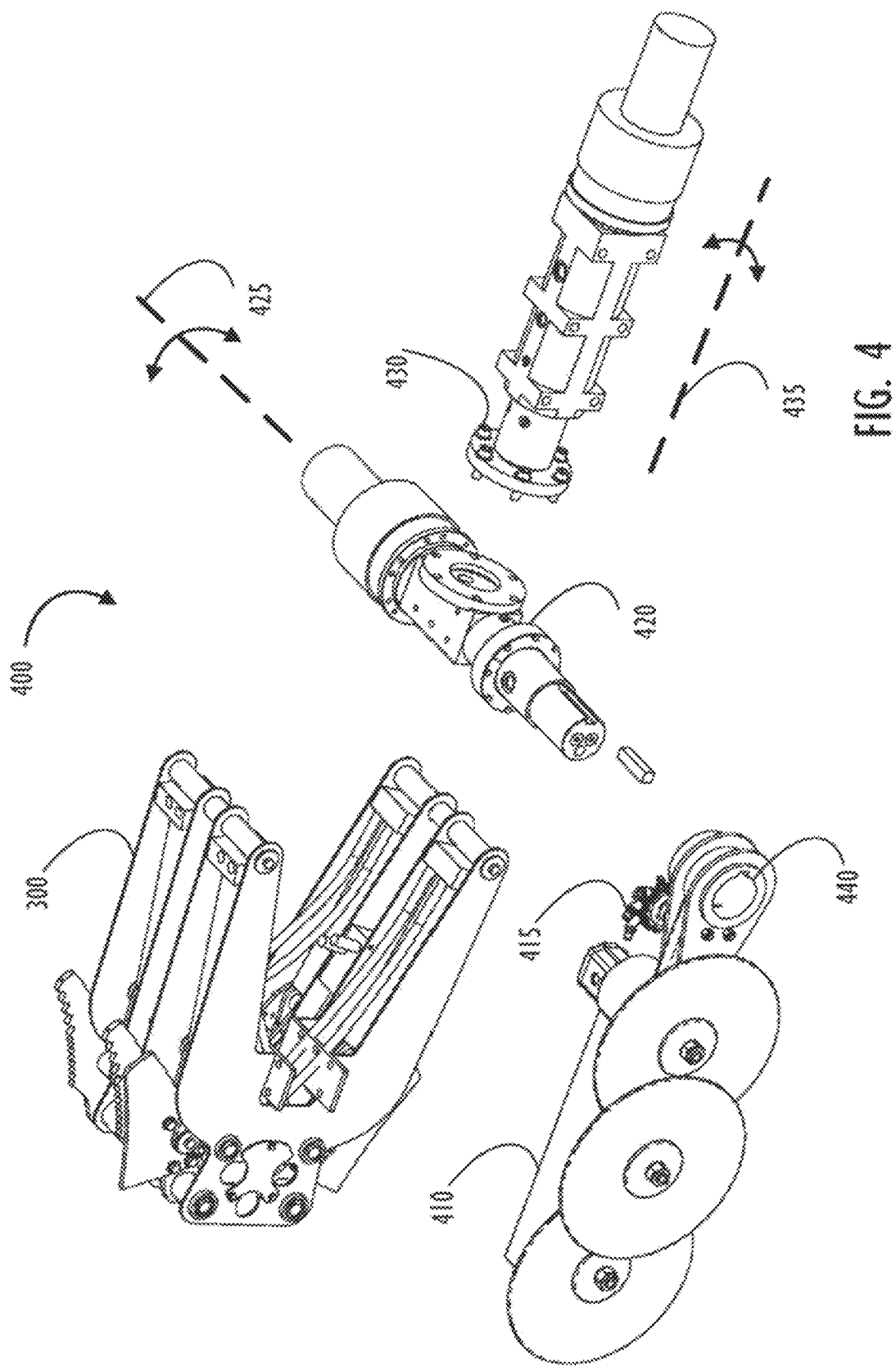

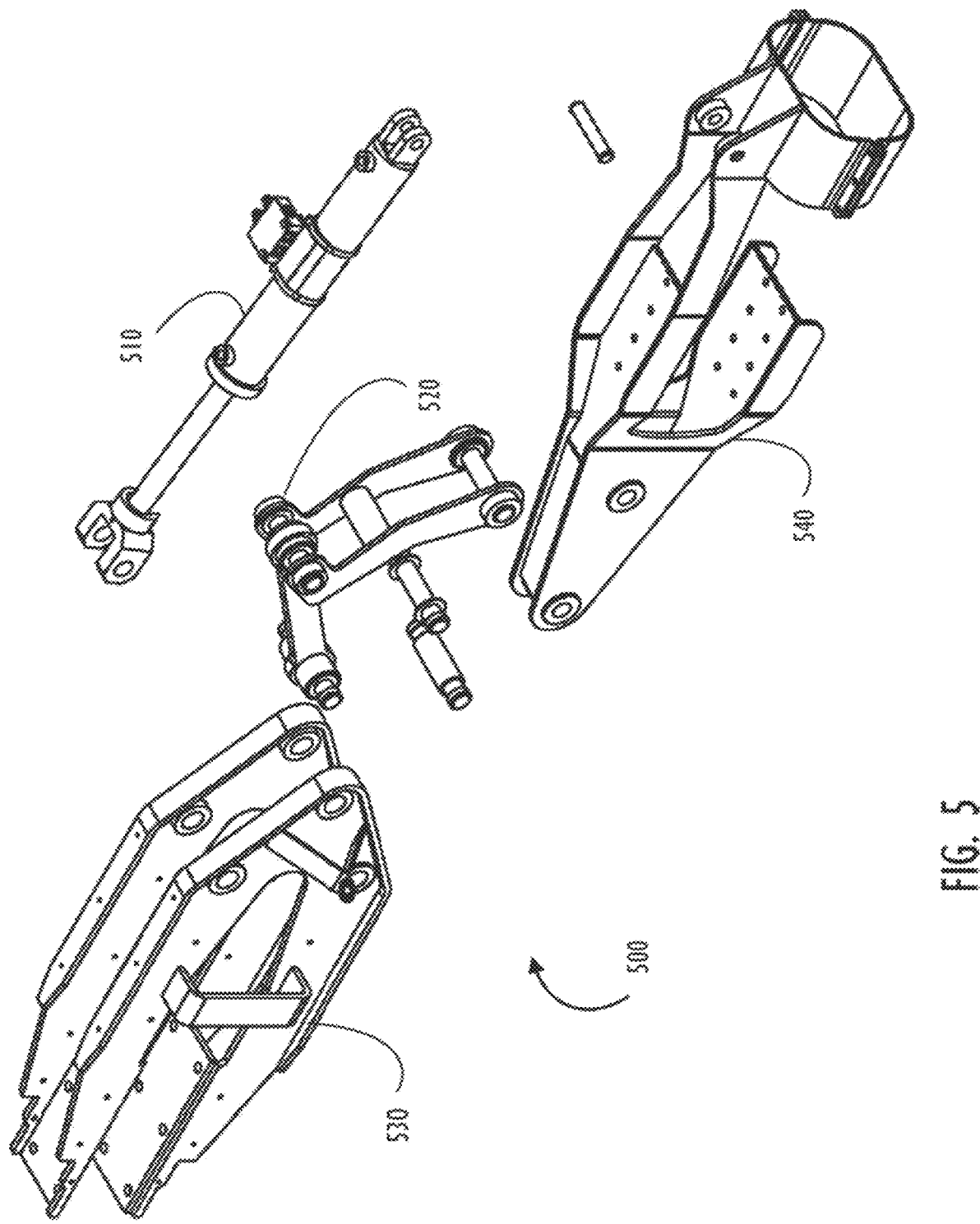

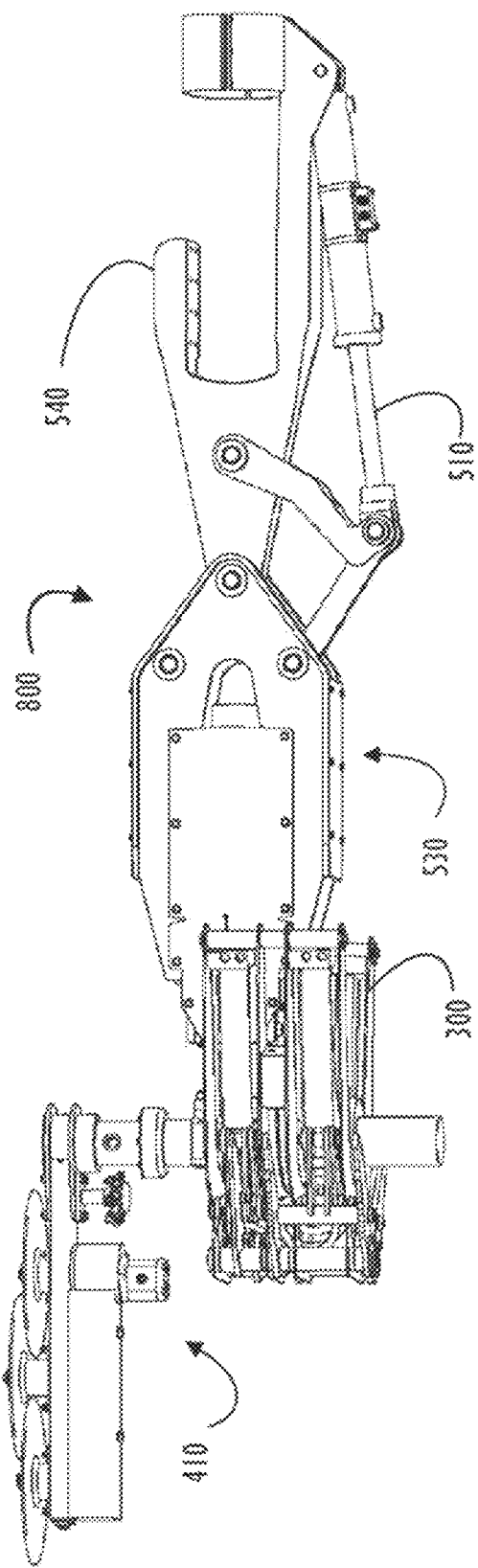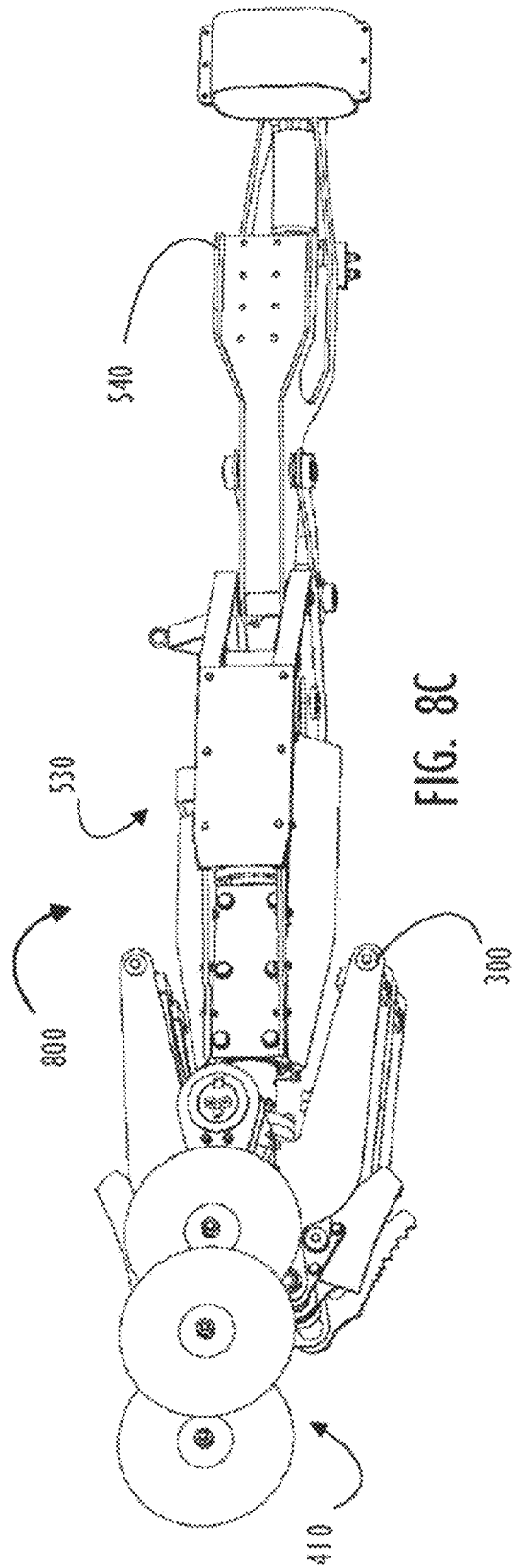

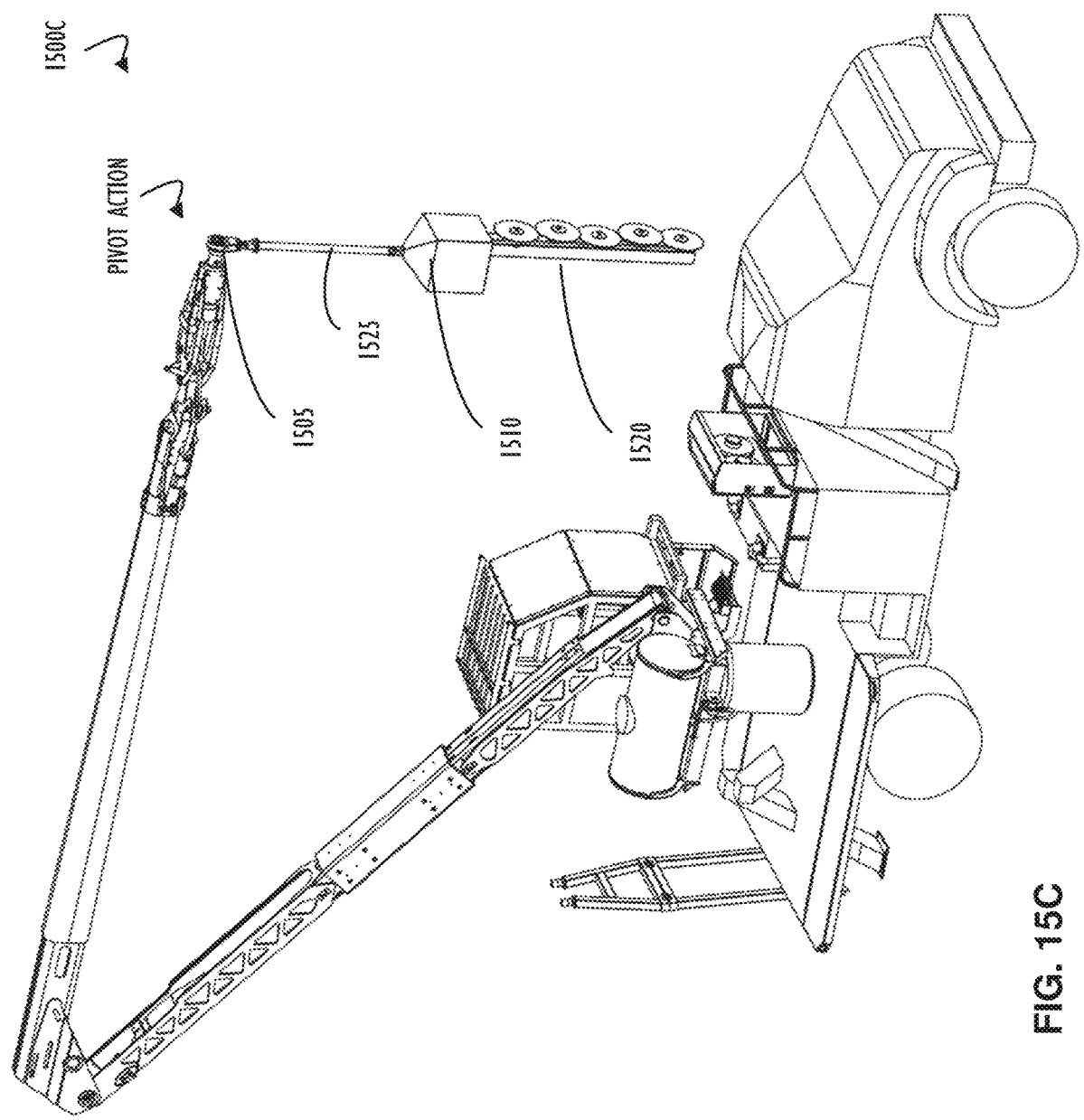

APPARATUS FOR AERIAL TOOL CONFIGURATIONS

CROSS REFERENCE TO RELATED APPLICATIONS

This disclosure is a continuation-in-part of, and claims priority to pending U.S. patent application Ser. No. 15/070,293, entitled "Apparatus for Tree Trimming and Tree Maintenance" filed 15 Mar. 2016 by Steven J. Terrell which is hereby incorporated by reference in its entirety for all available purposes. This disclosure is also related to U.S. patent application Ser. No. 13/441,377 entitled "Apparatus for General Tree Trimming or Precision Tree Trimming" filed 6 Apr. 2012 by Steven J. Terrell which is hereby incorporated by reference in its entirety for all available purposes. This disclosure is also related to U.S. patent application Ser. No. 13/441,453 entitled "Apparatus for General Tree Trimming or Precision Tree Trimming Having an Aerial Tank" by Steven J. Terrell filed on 6 Apr. 2012 which is also incorporated by reference in its entirety. This disclosure also relates to U.S. Provisional Application No. 61/482,807 filed 5 May 2011 to which priority is claimed and which is also incorporated by reference in its entirety.

FIELD OF INVENTION

This disclosure pertains to a reconfigurable extendable boom mounted aerial apparatus that allows for the quick connect/disconnect of one or more aerial tool configurations for trimming trees, vegetation, material handling of cut debris, chemical spraying, water blasting, equipment decontamination, de-icing, demolition, and more particularly to an apparatus configurable, possibly in the field, for either ground based semi-precise aerial trimming of trees, vegetation, and material handling of cut debris, chemical spraying, water blasting, equipment decontamination, de-icing, demolition, or for precision ground based aerial applications.

BACKGROUND

Electrical power lines often run through heavily wooded areas, either in neighborhoods or in rural areas. Normally a path, or right of way, is cut through such wooded areas to make way for the power lines, but eventually the trees or other vegetation will encroach upon this path and it will need to be trimmed back. For example, tree limbs, over time, may grow over the power lines, presenting the risk of damaging the lines should the limbs fall or make contact with the lines during a storm. Typically, such trimming is required every five years or so, although this time period may be shorter or longer in a given area. Because power lines often span long distances, such as hundreds of miles, a trimming operation may be a complex and time intensive endeavor for which efficiency is a consideration. Two different types of approaches have been used in the prior art. Typically, to trim around transmission lines (which go cross country) a rough cutting and partially automated mechanism has been used. Alternatively, in residential/commercial areas serviced by electrical distribution lines a manual approach has been utilized.

In one common manual approach, a mobile unit such as an "insulated bucket truck" is utilized. The bucket truck has an insulated bucket or basket connected to an insulated boom (crane like structure), which is in turn connected to the chassis of the truck. The bucket (or "basket" as it is sometimes known) contains room for a worker and associated tree trimming equipment, such as a hand operated chainsaw or hydraulic pole saw. Once in the bucket, the worker may be lifted up to an appropriate height and location to trim the trees. Thus, the worker can manually cut tree limbs to combat encroachment of the trees toward the power lines. This approach, however, is not optimal for several reasons. The manual approach is slow, involves potential risk of injury to the worker and associated potential liability, and might allow the cut refuse to fall freely and dangerously to the ground. Alternatively, the cut refuse may be manually lowered with a rope to the ground below, but this is slow and cumbersome.

Improvements over the bucket technique have been introduced in the prior art, such as that described in U.S. Pat. No. 5,501,257 (the '257 patent), which is incorporated by reference in its entirety. The '257 patent describes a boom with a mountable assembly on the end instead of a bucket. The assembly contains jaws for clamping a tree limb to be cut and a saw arm for cutting the grasped limb. The assembly can spin the saw arm around the axis formed by the boom to allow the jaws to be brought into alignment with a tree limb and then rotate the saw arm in a circular fashion to cut the clamped limb. After cutting, the saw blade may be retracted and, in theory, the cut tree limb will be held in place by the jaws, which will then allow the operator to place the cut limb on the ground for disposal.

Another prior art practice relating to tree clearance around electrical lines involves the trimming of tree limbs and administration of herbicides or wound dressing to impede future tree growth. Herbicides administered using the bucket technique described above suffer from concerns about the health and safety of the aerial worker falling or coming into contact with dangerous herbicides or inadvertent electric shock when a liquid comes in contact with a power line. An automated distribution of herbicides from an apparatus at the end of a boom represents an improvement over the bucket technique and is described in U.S. Pat. No. 6,990,770 which is hereby incorporated by reference herein.

As explained above, certain prior art techniques have been used to provide an efficient yet somewhat non-precise solution to cutting of tree limbs and other foliage around rights of way. In particular, prior art approaches are limited with respect to a comprehensive axial rotation of an aerial tool assembly. Additionally, prior art solutions are usually limited in the amount of reconfiguration available in the field for the entire tool apparatus attached to the distal end of the aerial boom. Therefore, it would be desirable to provide a more precise and possibly field configurable apparatus for trimming foliage around power lines and other areas where automated, yet precise trimming may be desired. Additional applications (e.g., other than tree-trimming) are also possible. In general, a solution is needed for performing automated aerial tasks from a ground based vehicle in a more field-configurable manner. This disclosure presents several embodiments of such a solution.

BRIEF DESCRIPTION OF THE DRAWINGS

FIG. 4 illustrates an exploded view of an aerial tool assembly, saw bar arm, and axial rotations connections, according to one or more disclosed embodiments.

FIG. 5 illustrates an exploded view of a boom attachment mechanism, actuator arm and aerial tool assembly mounting bracket, according to one or more disclosed embodiments.

FIGS. 8A-C illustrate, in different perspective views, a boom actuator and attachment assembly and a connected aerial tool assembly in one possible configuration, according to one or more disclosed embodiments.

FIGS. 15A-C illustrate different views of a truck with boom attachment mechanism, actuator arm, rotator and an attachable and detachable aerial tool configuration comprising a plurality of cutting blades, according to one or more disclosed embodiments.

DETAILED DESCRIPTION

Figure 1:
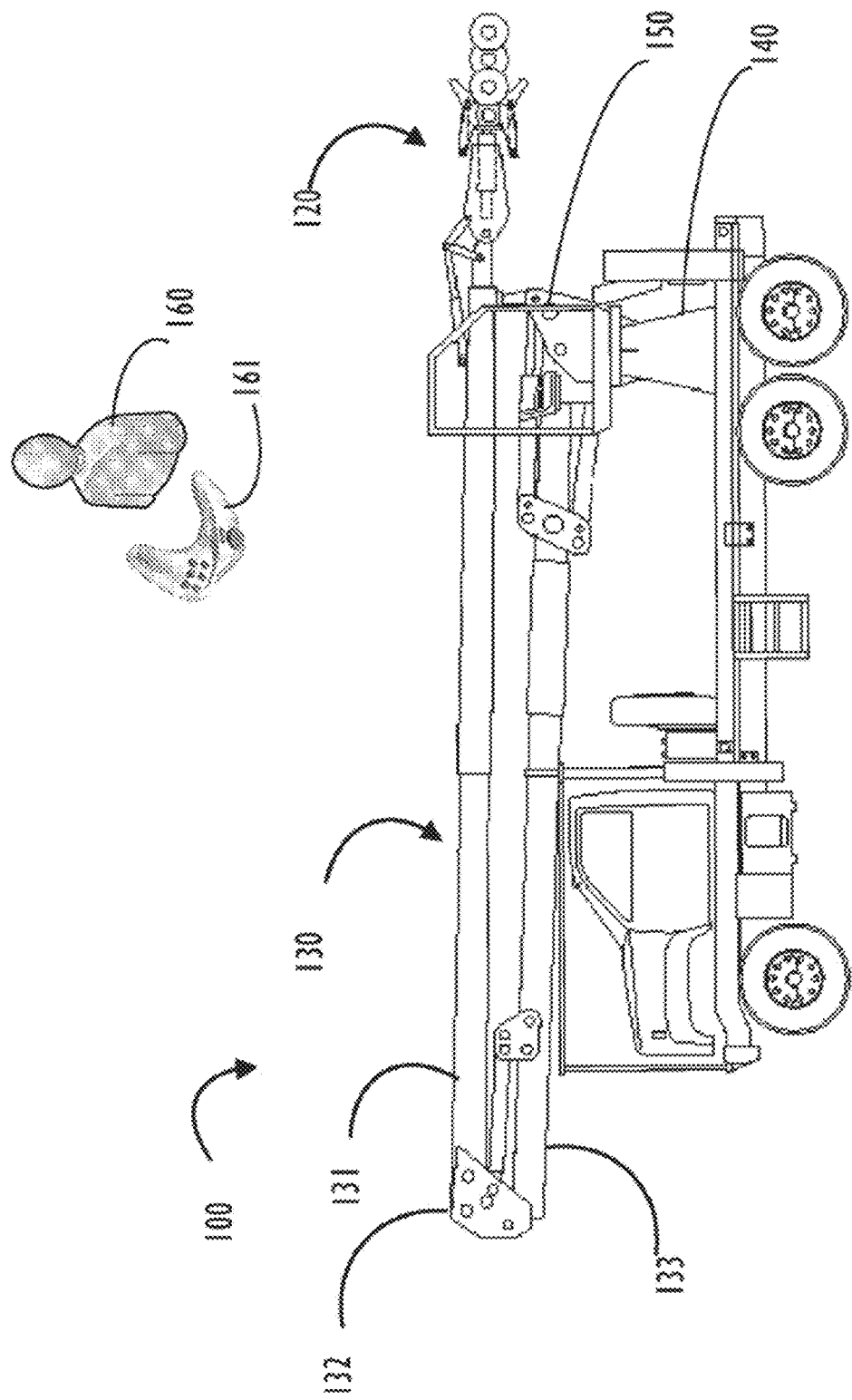
FIG. 1 illustrates a truck with a boom, to which may be connected an apparatus for performing aerial tasks including trimming of trees and other vegetation, according to one or more disclosed embodiments.

Disclosed herein is an apparatus preferably coupled to an aerial boom on a truck or any other mobile carrier chassis that allows for the reconfiguration and application of various attachable and detachable aerial tool configured boom assemblies to perform a desired task. The apparatus may be capable of being configured into a plurality of configurations in the field via "quick connect/disconnect" sealable couplings. The quick connect/disconnect sealable couplings may be used, in some embodiments, for attaching tools powered by hydraulic, pneumatic, or water/chemical hoses attached to ports of differently designed swivels, rotators, or actuators.

In some configurations, the apparatus may be capable of performing rapid semi-precise cutting of vegetation. In an alternate use, mode, or configuration, the apparatus may be capable of performing precision tree trimming of one or more limbs. The apparatus may also optionally utilize a limb clamp or grapple mechanism with a plurality of opposing clamping arms. These additional clamping mechanisms may be used, for example, to hold any limb(s) being cut thereby preventing the cut limbs from inadvertently falling on objects directly beneath the work area. Additionally, clamping mechanisms may allow the operator to place the limbs on the ground or in a chipper, grinder, or dump body, for disposal.

Another possible configuration of the disclosed apparatus may allow for simultaneous or independent trimming and chemically treating trees or other vegetation. The working end of the boom (e.g., distal or far end with respect to the mobile carrier) may also be configured into a grapple mechanism with a plurality of opposing clamping arms and/or to include a chain saw assembly for use in large tree limb, trunk removal and storm debris clean up. The grapple and/or chain saw assembly configuration may utilize quick connect/disconnect sealable hydraulic couplings for connecting and disconnecting from the boom tip aerial tool attachment mechanism.

In prior art solutions, the grapple head jaws are typically oriented toward the ground. As a result of this orientation, the material handling of debris and removal has typically been utilized with a short limited boom reach. For example, using a short limited boom reach to pick up debris located on the ground or in piles and loaded in dump trucks, large roll off boxes or trailers. In contrast to typical prior art grapple equipment for debris removal, the grapple and/or chain saw assembly of the disclosed apparatus may be extendable upwards and articulated to achieve different solutions. In some embodiments, the tool assembly may be positioned at greater heights than prior art solutions, in part, by utilizing the aerial boom and aerial tool actuators to align the aerial tool configuration for various clamping and cutting applications.

In yet another configuration, an attachable and detachable aerial saw bar with a plurality of blades and an independent engine or electric rechargeable battery driven power pack maybe utilized when cutting access is limited. This aerial tool configuration may allow for the disclosed aerial tool to be utilized on various carriers. Specifically, envisioned is an ability to utilize the aerial saw bar from carriers with limited hydraulic flow and pressure capacities. By distributing the power sources available to a tool assembly, cost savings may be realized, in part, by reducing impact caused by costly hydraulic redesign modifications. Further, an aerial saw bar configuration may allow modification of some existing tree trimmer bucket trucks currently in use to have enhanced capability. For example, by disconnecting a bucket of a bucket truck and attaching the aerial tool configuration with independent power pack a new and useful configuration may be realized for reduced cost.

In still other applications, the aerial boom apparatus may be connected to the mobile carrier with a boom tip (e.g., distal end) configured for receiving, operating, supporting, attaching, and detaching one or more aerial mechanical tool configurations (e.g., an aerial tool assembly as discussed herein). As further described below, the disclosed aerial tool apparatus may be configured to perform specific work tasks at heights ranging from the proximity of ground level (e.g., several feet) to an excess of 125 feet in the air. Height limits may depend on the aerial boom extension capability and gross vehicle supporting weight and stability of the mobile carrier. Thus, weight parameters with regard to boom specifications and aerial tool configurations may need to be considered for each application.

To increase field configurability, the disclosed apparatus may be capable of being configured into a plurality of configurations in the field via "quick connect" type couplings. The quick connect type couplings may be used, in some embodiments, for attaching tools and for attaching hydraulic hoses to ports of specially designed load bearing swivels.

In some configurations, the apparatus is capable of performing rapid semi-precise cutting of vegetation. In an alternate use mode or configuration, the apparatus is capable of performing precision trimming of one or more limbs and optionally using a clamping mechanism to prevent cut limbs/vegetation from inadvertently falling on objects directly beneath the cutting area. The distal end of the boom may also be configured into a grapple type tool (e.g., a grapple head assembly) for use in relocating debris into a removal apparatus such as a dump truck, trailer, tub grinder or chipper. The grapple head assembly may utilize quick connect/disconnect style hydraulic connection couplings for connecting to the boom actuator and attachment mechanism. In contrast to prior art debris removal grapple equipment, the grapple head assembly may be extendable upwards utilizing the aerial boom.

While the present disclosure is described with examples in the context of trimming trees around electrical lines, there are many other areas which may also benefit from embodiments of an aerial tool apparatus as disclosed herein. In a first use case, the aerial tool apparatus may be configured as a precise and automated tree trimming apparatus as disclosed. For example, sometimes heavy foliage develops as a canopy over road-ways and in residential areas possibly overhanging structures. An apparatus from some embodiments disclosed herein may be useful in vegetation maintenance that may be desired in those areas. Additionally, several types of industries may require vegetation maintenance in varying degrees of precision, such as, residential homes, municipalities, rail roads, tree growers, pipeline companies to maintain rights of way, ski lifts, parks and recreation, etc. Therefore, the disclosed embodiments are not intended to be limited to maintenance of foliage around electrical lines but will have other uses as will be apparent to those of ordinary skill in the art given the benefits of this disclosure. Furthermore, while the present disclosure is described in the context of tree trimming, there are other various industry applications that may benefit from these aerial tool configuration embodiments. Also, throughout this disclosure like elements from earlier embodiments are labeled with the same element numbers and are not always further discussed in every embodiment.

Referring now to FIG. 1, truck 100 is shown according to one disclosed embodiment. Truck 100 comprises a boom 130 and an aerial tool apparatus 120 connected to a far end (i.e., distal end) of boom 130 with near end (i.e., proximate end) of boom 130 connected to truck 100. Aerial tool apparatus 120 comprises multiple section, connection points, and actuators to allow aerial tool apparatus 120 to be configured into a variety of different operational modes depending on a cutting task. Truck 100 illustrates a conventional vehicle suitable for managing the terrain in the area of interest for maintenance of vegetation. Although shown as a truck 100, any type of vehicle, carrier, or trailer suitable to reach the area of interest could be used (e.g., work-boat, railcar, truck carrier, off-road, rubber tire carrier, crawler, truck equipped with hi-rails, telehandler, track carrier, crane, etc.). The transport vehicle, such as truck 100, may also take into account operating characteristics of the boom and aerial tool apparatus 120 (e.g., rollover prevention, stress loading, operator safety and visibility, boom overload sensing capability, aerial boom camera, vehicle level sensing, vehicle GPS logging, mapping and software capabilities, unmanned remote control operated vehicle, etc.). Specific capabilities for each of boom 130 and aerial tool apparatus 120 will be described in more detail below.

Boom 130 may be constructed from fiberglass, steel, a combination thereof, or other suitable material. Construction of boom 130 may take into account work areas in proximity to electrical power lines and therefore it is preferable for the boom to be insulated completely or have at least one section (typically more than one) that acts as an insulator to electrical current. Additionally, boom 130 may be made up of one or more sections (e.g., upper boom 131 and lower boom 133) for extension and/or articulation. For example, boom 130 could be a telescoping boom with one or more movable sections, a multi-section over-center knuckle boom, a non-over center knuckle boom, or a combination knuckle and telescoping boom. Each embodiment of boom 130 as a knuckle boom may comprise one or more knuckle joints 132. In some embodiments, a combination of telescoping sections and knuckle joints 132 may be utilized. When designing embodiments of boom 130, weight capacity of boom 130 may also be considered (e.g., for support of an aerial tool assembly and attachments) as well as accounting for duty cycles of boom 130 itself. Non-conductive hydraulic and chemical supply lines may comprise hoses or hard lines or any combination thereof and may be internal, external or a combination of both to boom 130 and aerial tool apparatus 120. In one embodiment, the hydraulic hoses are internal to the boom structure to avoid entanglement when boom 130 is maneuvered around and through vegetation and other objects in the work area. In one embodiment, up to thirteen (13) hoses each capable of 3000 pounds per square inch (PSI) pressure could be utilized. When hoses are internal or external to a telescoping embodiment of boom 130, hoses may be able to travel while boom 130 actuates and extends or retracts, as the boom actuates, extends or retracts the hoses are spooled onto or off of a hose type real or spooling mechanism. A pass through swivel may allow for ported hydraulic fluid conductivity through areas of axial rotation.

In a multi-section boom, configured as either a telescoping embodiment with one or more movable sections (e.g., a knuckle joint embodiment or a combination of telescoping and knuckle joint embodiment), it may be desirable for each section to be capable of manipulation independently of other sections. As shown in FIG. 1, boom 130 is attached to a transport vehicle, such as truck 100, at a fixed pedestal 140 and rotatable around an axis perpendicular to the chassis of the transport vehicle. Operator platform 150 typically rotates with boom 130 to allow for easier operator control. Also, as explained in more detail later, Boom 130 may also have a liquid supply tank mounted above all or a majority of the articulation points of the boom to minimize or eliminate need for supply hoses to travel internal to the boom's structure. FIG. 1 also shows an operator 160 and remote control 161, described in more detail below. Remote control 161 may allow an operator 160 to control boom 130 and aerial tool apparatus 120 from a location other than in operator platform 150. In another configuration, the operator platform 150 is not provided and the remote control may be used. In cases that require a high volume spray capacity, a larger tank and high pressure water chemical pump may be mounted on the vehicle with water/chemical supply lines externally attached to the boom and spray head.

In operation, some disclosed embodiments could be controlled either from a protected operator cab 150 on a transport vehicle (e.g., truck 100) or by a remote control pack 161. A remote control pack 160 could be a "belly pack" and emulate the control capabilities available from within the standard operator cab (e.g., operator cab 150). One benefit of a remote control belly pack 161 is that it may allow the operator 160 to be a safe distance from truck 100 when truck 100 is in operation. In another operational disclosed embodiment, it could be preferable (i.e. cost savings, weight, additional safety, etc.) to exclude the need for the operator cab and operate the controls with the wireless remote control belly pack 161.

Figure 2:
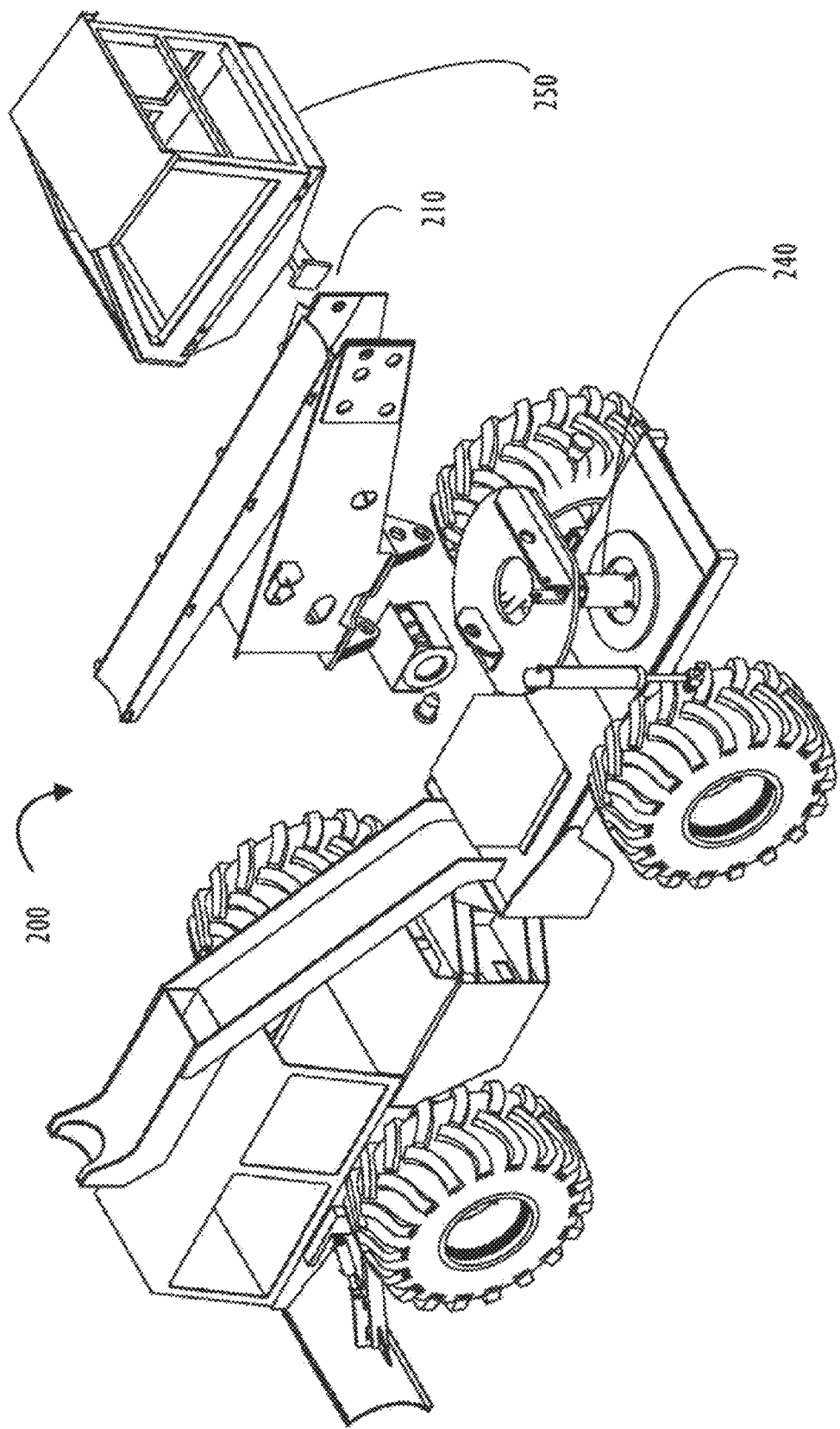
FIG. 2 illustrates an alternative transport vehicle for a boom and aerial tool assembly, according to one or more disclosed embodiments.

Referring now to FIG. 2, transport vehicle 200 illustrates one possible alternative carrier for a boom similar to boom 130. Transport vehicle 200 comprises a rotational pivot 240 to allow the entire boom assembly to rotate about an axis perpendicular to its central axis. Operator cab 250 may be attached to the base of boom 130 or to the upper portion of rotational pivot 240 with a self-leveling connection (not shown) at point 210. The self-leveling connection may allow an operator inside operator cab 250 to maintain a level perspective with the horizon even if transport vehicle 200 is on uneven terrain, thereby aiding the operator in performing precision tree trimming according to the several disclosed embodiments. Operator cab 250 may also act as a counter balance weight for transport vehicle 200 and an extended boom 130 in certain situations.

Referring now to FIGS. 3A-D aerial tool assembly 300 is typically configured at the far end of tree trimming apparatus (e.g., aerial tool apparatus 120 from FIG. 1). Aerial tool assembly 300 performs the actual cutting and clamping (if required) of the target vegetation. Aerial tool assembly 300 provides for one or more separate independent tool functions. Also, aerial tool apparatus 120 is attached to boom 130 via a boom clamp 540 (described with FIG. 5). However, any other suitable aerial tool attachment mechanism may be utilized. Aerial tool assembly 300 is shown in different perspective views in FIGS. 3A-D for a single example embodiment. Recall that aerial tool assembly 300 is field configurable, with a variety of tree maintenance accessories, for a particular tree cutting environment or task. For example, aerial tool assembly 300 may be configured in the field with a plurality of attachments based on an operator's particular needs to complete a given work effort. In this example embodiment, aerial tool assembly 300 is configured to have as accessories a limb shear 310 with opposing cutting blades, and limb clamp (or grapple mechanism) with opposing clamping arms such as limb clamps in the form of opposing clamping arms 320 (or a grapple clamp), and could include, if required, any of several sawing devices (not shown), such as a chainsaw blade, a single rotary saw blade, or a mechanism with multiple rotary saw blades. As used herein, a "shear" refers to any of various implements or machines that cut with a scissor like action in contrast to cutting by wearing away a material as in sawing. An example of a saw arm attachment 410 containing three rotary saw blades or a chainsaw style blade may be seen in the Figures, and will be described subsequently, but is not shown in FIGS. 3A-D so that further details of limb shear 310 and opposing clamping arms 320 (e.g., limb claims) attachments may be appreciated.

In one embodiment, limb clamp (or grapple mechanism) with opposing clamping arms 320 is configured as a proportional pressure clamp, in part, because different types of wood have different densities and breaking thresholds. Furthermore, the size and opening and closing capacity of the opposing clamping arms may vary depending upon the size of material to be cut and handled. Additionally, limb clamp (or grapple mechanism) with opposing clamping arms 320 may be configured with serrated teeth that vary in size and shape to improve gripping capability as clamping pressures may vary from the throat of the jaws to the tips of the jaws. When configured with a limb clamp (or grapple mechanism) with opposing clamp arms 320 and a limb shear 310, aerial tool assembly 300 may be used for very precise single limb cutting. Precise control may be required to prevent cutting a plurality of limbs and to prevent the cut portion from falling on objects beneath the point of cut. In use, an operator 160 may also simply rotate the cut portion to be vertical so that it may be released and more easily fall through lower vegetation to the ground or placed on the ground or loaded in a truck bed, trailer, tub grinder or chipper. Aerial tool assembly 300 also has a plurality of hydraulic hoses 330 independently connected to different attachments to allow operator 160 to operate each attachment and separate independent tool function as required for the task at hand (for clarity not all hoses of FIGS. 3A-D have element numbers).

Referring now to FIG. 4 exploded view 400 illustrates aerial tool assembly 300, saw bar arm 410, and other elements that are typically incorporated into certain embodiments of tree trimming apparatus 120. View 400 also shows two axis, represented by dashed lines 425 and 435, which are generally perpendicular to each other and indicate axial rotation capabilities of embodiments of aerial tool apparatus 120. In this example, saw bar arm 410 includes a three rotary blade assembly for cutting. Axial connection 420 allows saw bar arm 410 to rotate around axis 425 in a bi-directional continuous circular rotation. Alternatively, to induce movement, the operator may discontinue the saw bar rotation and position the saw arm in a fixed position and use the boom to move the cutter blade(s) thereby cutting the targeted vegetation with the rotating saw blades. As will be understood, the plane of rotation of saw bar arm 410 will be generally parallel to the plane of the far end section of boom 310 (taking into account any angular change produced by actuator arm 510 described below with reference to FIG. 5). Also, axial rotator connection 430 allows for bi-directional continuous circular rotation (around axis 435) of all components connected to the far side of axial rotator connection 430. As shown, axis 435 is generally in line with the far end of the boom 130 (e.g., a boom axis), based on actuator arm 510 adjustment, and allows for a wrist-like rotation capability for portions of aerial tool apparatus 120 in certain embodiments. Each of axial connection 420 and axial rotator connection 430 also include a type of swivel assembly which provides independent fluid conductivity between a plurality of ports on either side of the swivel. In use axial rotators allow an operator to rotate an entire attached assembly in excess of 360 degrees in either direction continuously relative to its corresponding rotational axis (e.g., 425 and 435). Also shown in view 400 is chemical spray manifold 415 located on saw bar arm 410.

In this example, chemical spray manifold 415 (more generically, sprayer) comprises one or more applicator heads that may be used to apply herbicide when saw bar arm 410 is in use (or idle). Another chemical spray head (not shown) could be positioned within aerial tool assembly 300 to apply herbicide when limb shear blades 310 are in use. Note that limb clamps in the form of opposing clamping arms 320 are fully closed in the embodiments of FIGS. 3A-C. However, as shown in FIG. 4, limb clamps in the form of opposing clamping arms 320 may also be fully opened as to be non-intrusive to the work area when not in use. Also note that saw bar arm 410 may remain in a fixed position, relative to aerial tool assembly 300 and, while in this configuration, boom 130 may be moved to bring the aerial tool assembly 300 into position to cut a target limb. As explained above, saw bar arm 410 may rotate in excess of 360 degrees around an axis 425 defined by saw bar arm attachment point at axial connection 420. Saw bar arm 410 may also be rotated back and parallel to boom 130 when not in use (or removed completely), for example, to keep saw bar arm 410 from protruding and to increase precision for another tool such as limb shear 310.

When cutting limbs of a smaller size, it may not be necessary to use any sawing mechanism on aerial tool assembly 300, and instead cutting may be accomplished by limb shear 310. For example, an operator could manipulate boom 130 and use axial rotation of axial rotators along with actuator arm 510 to align limb shear 310 with a target limb. The operator could then use the proportional pressure and variably serrated clamps to grab and hold a portion of the target limb that is to be cut from the tree. The shears could then be activated to cut the target limb and the cut end would remain in the limb clamps in the form of opposing clamping arms 320 to be lowered to the ground. Any cut limbs could be rotated to fall more easily through the underlying foliage or power lines as discussed earlier. Also, limb shear 310 and the enhanced axial rotation capabilities described allow an operator using the disclosed apparatus to make an "arbor cut" which was difficult or impossible with prior art mechanical solutions. As used herein, an "arbor cut" refers to various well recognized tree trimming or pruning techniques as published by the International Society of Arborists (ISA) and are generally performed manually. For example, when cutting a limb, it may be done at an angle relative to the limb itself rather than making a straight perpendicular cut. Different types of angle cuts could be important because of potential tree care and future growth concerns.

Referring now to FIG. 5, view 500 illustrates an exploded view of example connectors that may be used to link components of aerial tool apparatus 120 to boom 130. In one embodiment, boom connector 540 connects to boom 130 using an attachment mechanism (e.g., bonding sleeve internal to boom to strengthen fiberglass structure) that slides over and bolts to a length at the end of the boom that may have increased structural strength. Different types of clamping/attachment mechanisms may be used for different types of booms and aerial tool configurations. View 500 also shows actuator arm 510 and actuator pivot connection 520. Actuator arm 510 comprises a wand cylinder that actuates approximately 90 degrees in either direction. At the far end of actuator arm 510 aerial tool assembly mounting bracket 530 is connected. Thus, aerial tool assembly mounting bracket 530 is connected to the boom via pivot connection 520 and connected to actuator arm 510. The combination of the actuator arm 510 and pivot connection 520 allow an operator to orient the entire tree trimming apparatus 120 at a particular angle relative to the far end of the boom. View 500 shows component parts 510, 540, and 530 that may be collectively referred to as an "actuator assembly."

Figure 6:
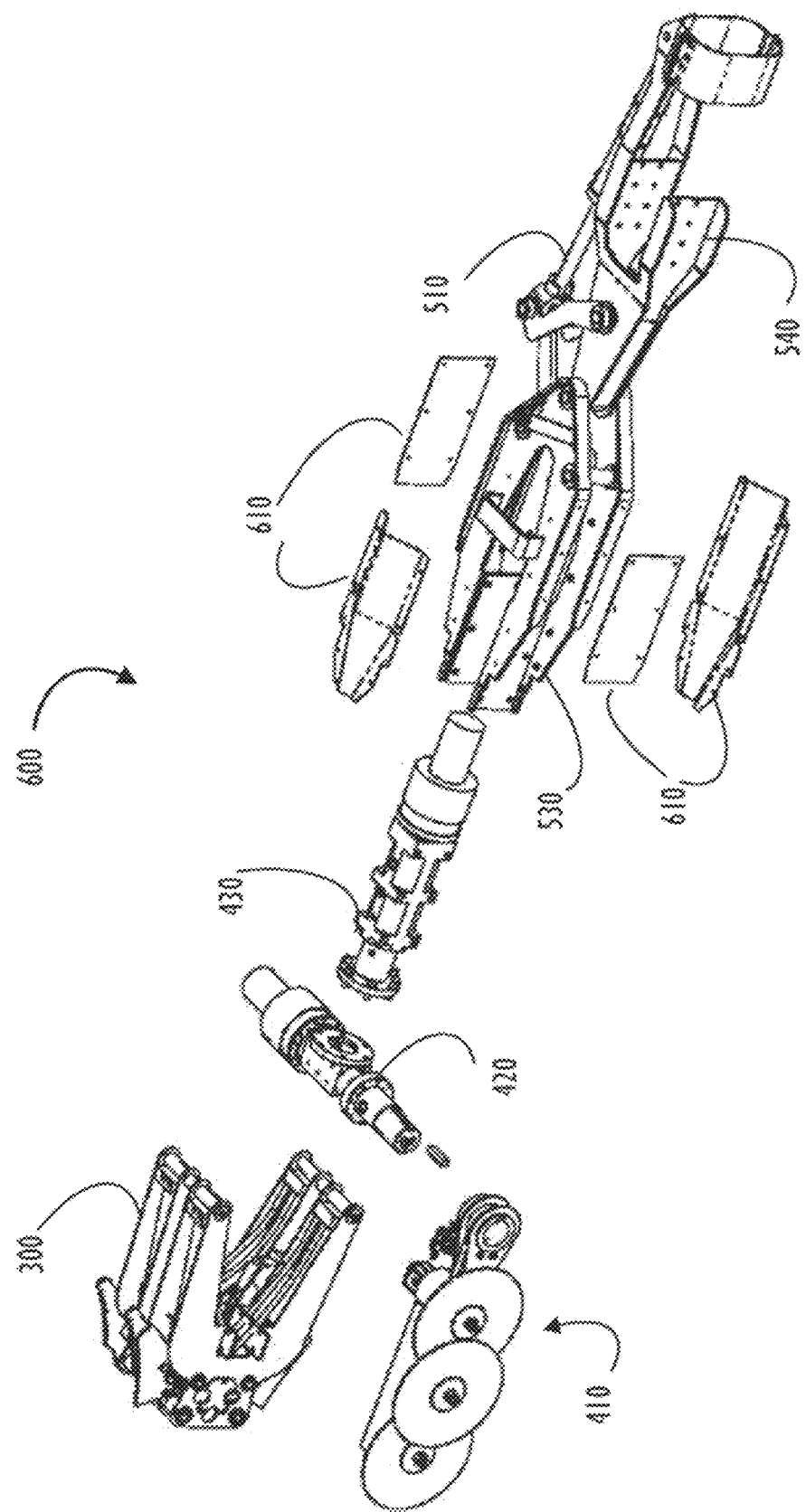
FIG. 6 illustrates an exploded view of elements from FIGS. 4 and 5, according to one or more disclosed embodiments.
Figure 7:
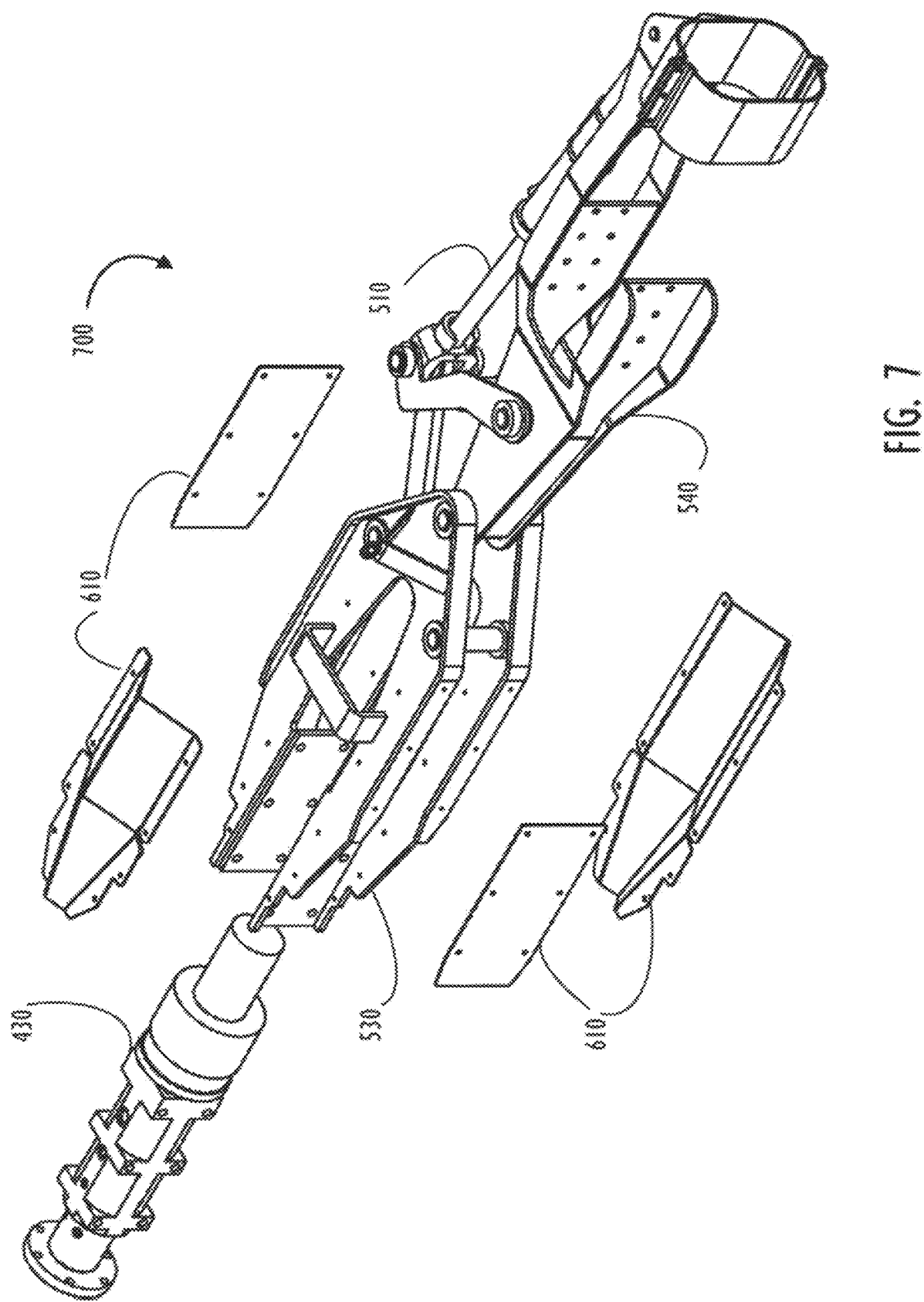
FIG. 7 illustrates another perspective view of boom attachment mechanism, aerial tool assembly mounting bracket, axial rotator, and actuator arm (e.g., an actuator assembly), according to one or more disclosed embodiments.

Referring now to FIGS. 6-7, exploded views 600 and 700 illustrate relative orientation of boom connector 540 to aerial tool assembly mounting bracket 530. Cover plates 610 are typically attached to aerial tool assembly mounting bracket 530 for safety and to keep cut debris from interfering with axial rotator connection 430 and hydraulic hoses not shown (see element 330 of FIG. 3). In this embodiment, axial rotator connection 430 connects partially inside aerial tool assembly mounting bracket 530 and is connected to axial connection 420 and in turn to saw bar arm 410 and aerial tool assembly 300. FIG. 7 illustrates a different perspective view 700 that further illustrates how axial rotator connection 430 connects inside aerial tool assembly mounting bracket 530 and is protected by optional cover plates 610.

Figure 8A:
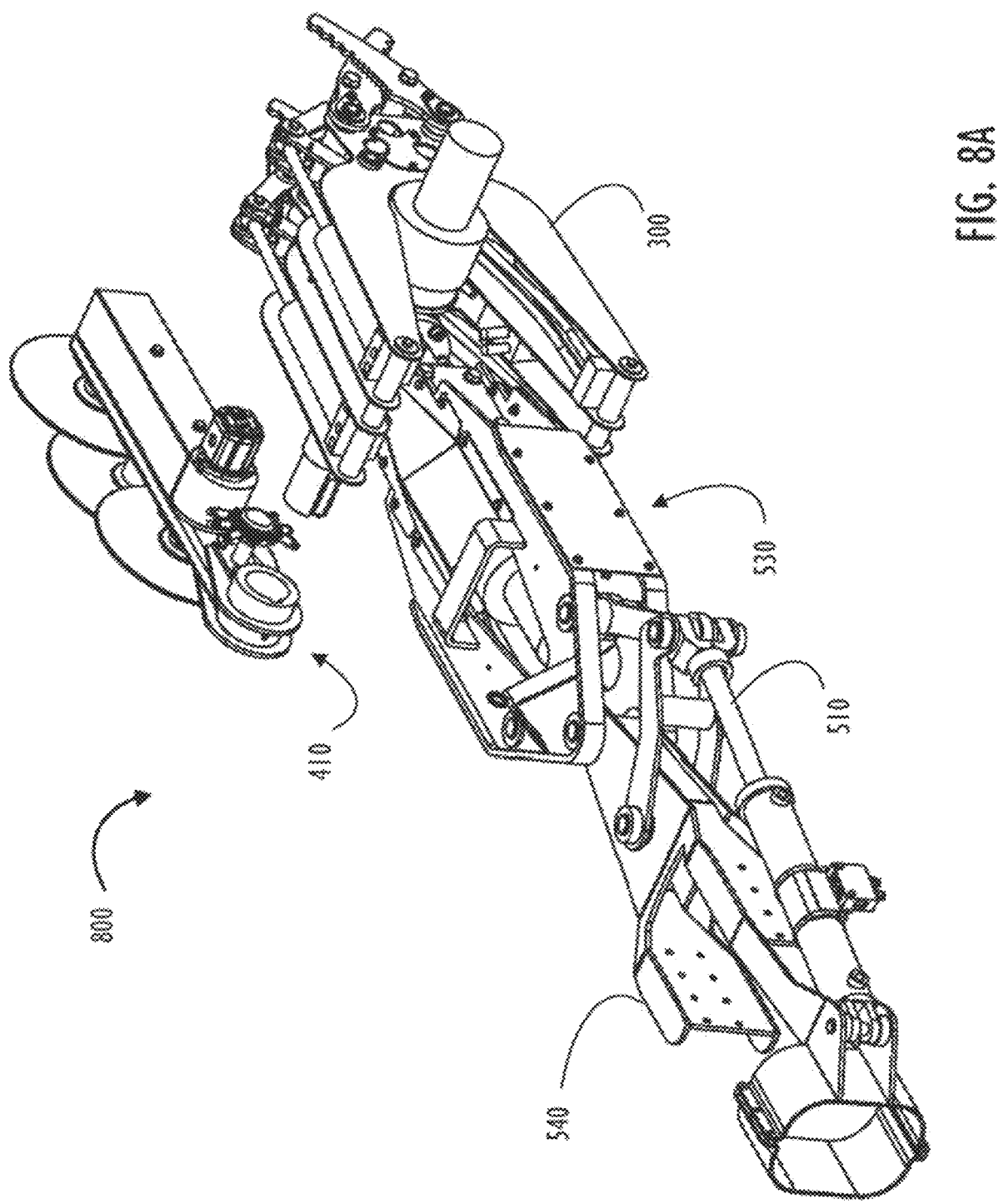

Referring now to FIGS. 8A-C, view 800 is shown from three different visual perspectives. Each of FIGS. 8A, 8B, and 8C illustrate a substantially complete configuration of aerial tool apparatus 120 incorporating the elements from FIGS. 3-7. In addition, FIGS. 10A-B also illustrate a substantially complete aerial tool configuration. Furthermore, a complete aerial tool configuration would be any tool or plurality of tools that is required at any given time that may be attachable and detachable from the configured aerial boom tip supporting end as shown in FIG. 5 and FIG. 7.

Figure 9:
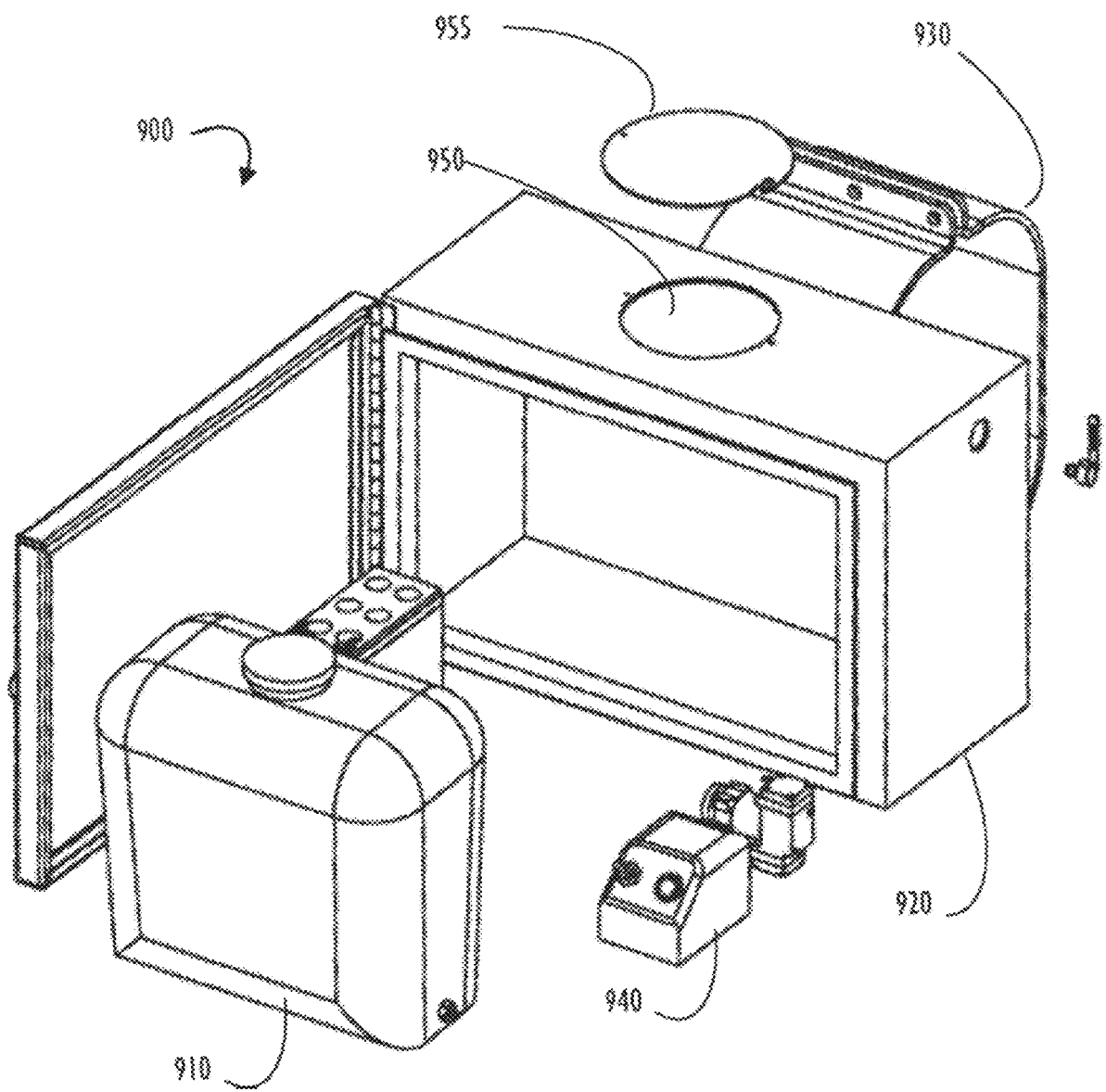
FIG. 9 illustrates a boom attachable tank and tank box, according to one or more disclosed embodiments.

Referring now to FIG. 9, tank box assembly 900 comprises a tank 910, a tank box 920 and a boom attachment 930 for tank box 920. Remote receiver 940 may wirelessly receive signals to control output of tank 910. Tank box 920 further comprises access port 950 and access port cover 955 which allow for refilling or adjustment of tank 910 without requiring removal of tank from tank box 920. Wireless access control of tank 910 may reduce or eliminate potential electrical conductivity issues associated with tank control operations.

Tank box 920 may be attached to the upper portion of insulated boom 130 with a bolted connection. The actual tank mounting connection may be an adjustable tank strap (e.g., 930), bolted foot mount, or bolted side rails (where the tank has feet that slide into the rails and lock down allowing for easy removal). Tank box 920 may be attached underneath the boom or on the outer side of the boom opposite the cutter head and mounted through or alongside the axial rotation connection to a steel sleeve in the inner end of the boom. As shown, tank box 920 may have a fill access port 950 where an operator could fill tank 910 without removing it from the boom and may have a drain port off of the discharge side hose connection to the tank allowing for cleaning or evacuation of residual chemical. A shut off valve could be placed just past the drain port to keep fluid from running out through the head when cleaning.

Tank 910 could be driven by a small pump and remote control. Alternatively, Tank 910 could be pre-charged with nitrogen or air (bladder inside tank 910 or sealed plunger inside tank 910) or could be driven with a hydraulic cylinder. A high pressure discharge hose (e.g., 1110 from FIG. 11 described below) could be connected to tank 910 with a quick connect fitting. Tank 910 would typically be used for low volume chemical applications and be connected to a sprayer head to spray chemicals proximate to aerial tool assembly 300. In other words, a sprayer head could be configured to spray on the foliage being cut, aerial tool assembly 300, saw bar arm 410, limb shear 310, etc. Discharge hose 1110 may be connected to a portion of aerial tool assembly 300 or pass through a port on the swivel connection included in one of the axial rotators. Also, tank 910 may be made of high strength fiberglass (similar to a water softener tank), steel with an internal liner to allow for chemical resistance, or high strength PVC. In general, any material that will effectively and legally accommodate the internal chemicals and discharge mechanism and not overly increase weight on boom 130 could be used. In summary, tank 910 also allows for automatic precision spraying of low volume chemicals without requiring close proximity to the operator.

Figure 10A:
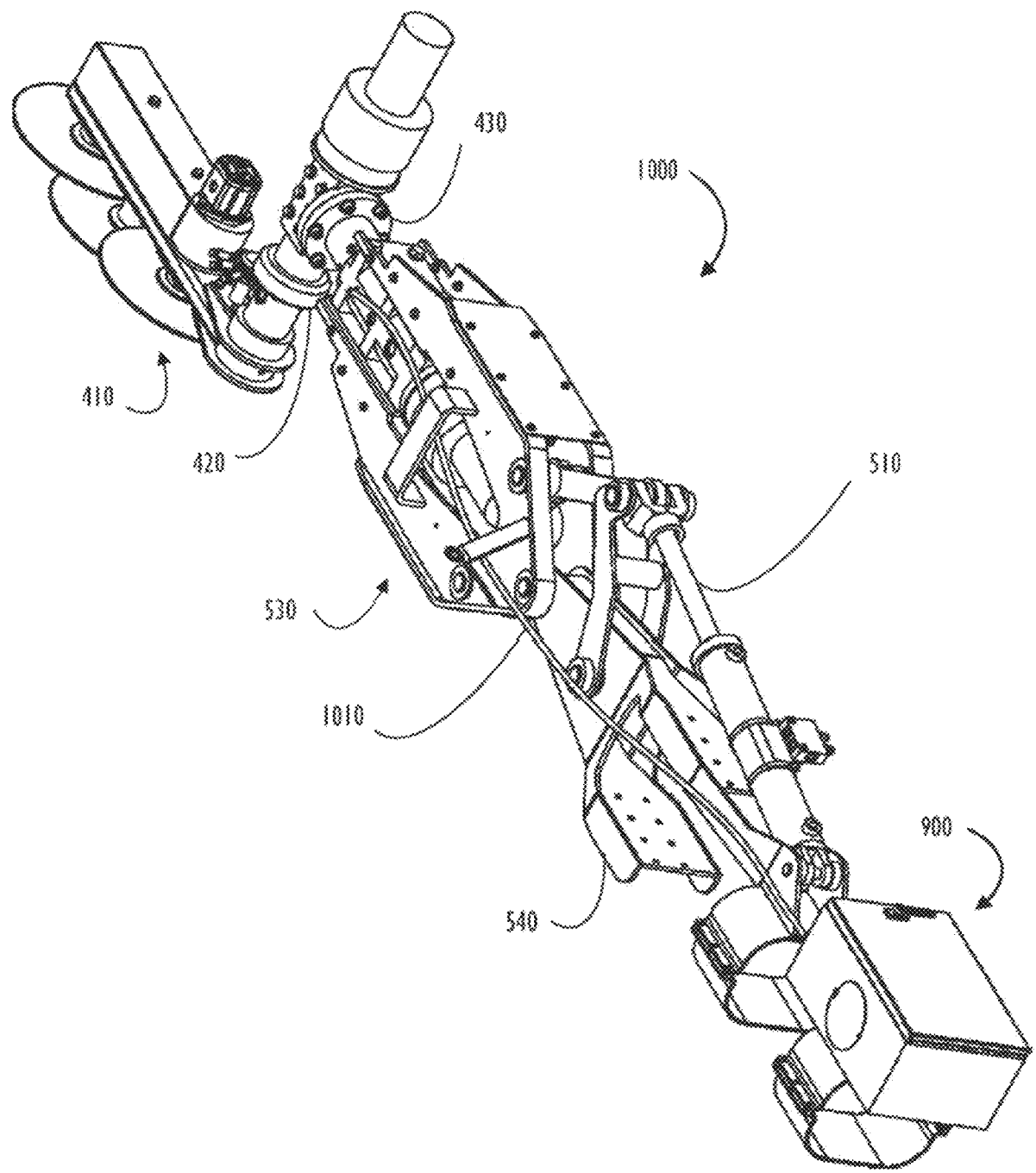
FIGS. 10A-B illustrate different perspective views of a substantially_complete boom assembly, according to one or more disclosed embodiments.
Figure 10B:
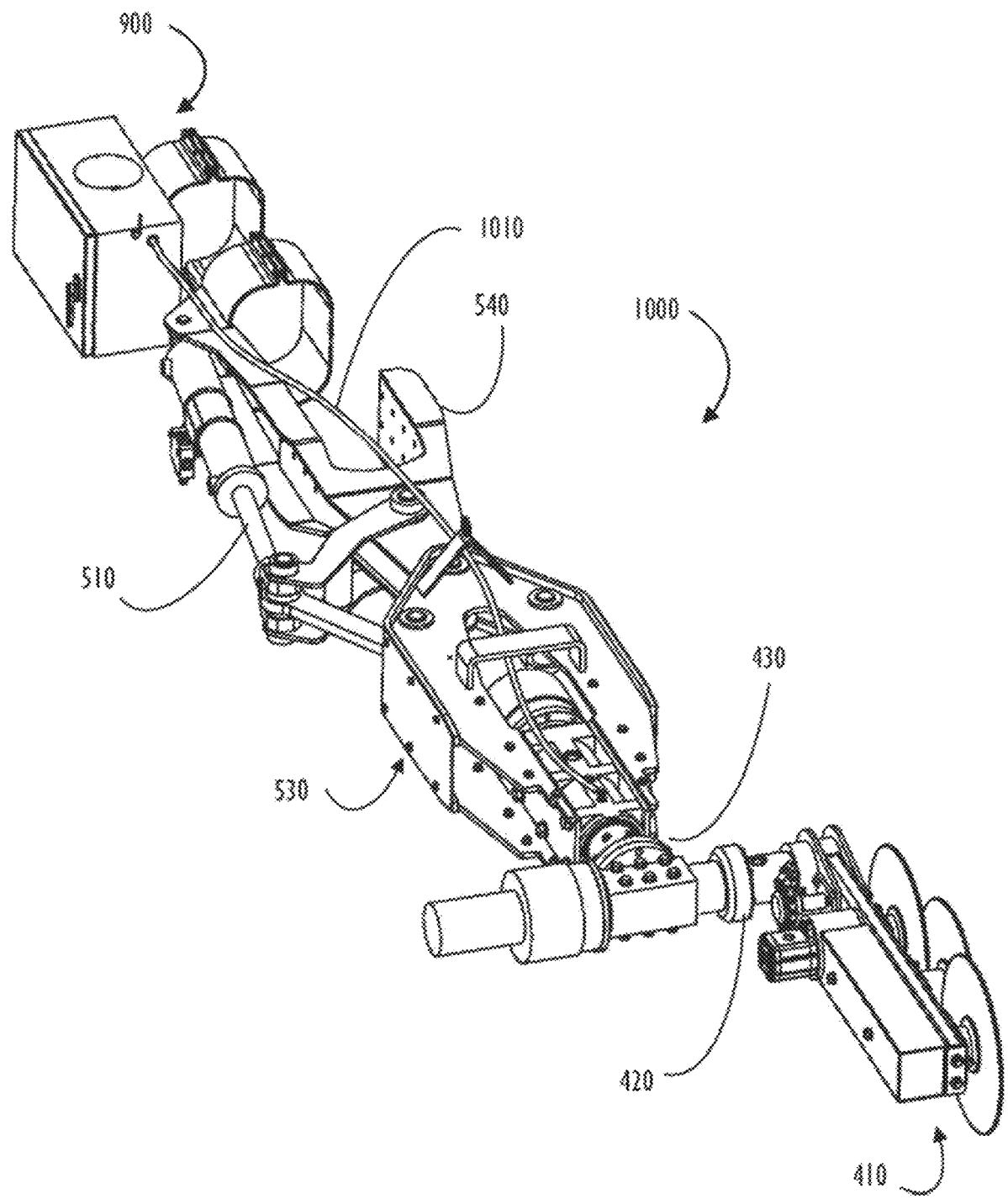

Referring now to FIG. 10A-B, two different perspective views 1000 illustrate tank box assembly 900 in conjunction with other elements of tree trimming apparatus 120 in one example embodiment. Supply hose 1010 connects through axial rotator connection 430 via a ported swivel so as to not impede rotational capabilities of aerial tool assembly 300.

Figure 11:
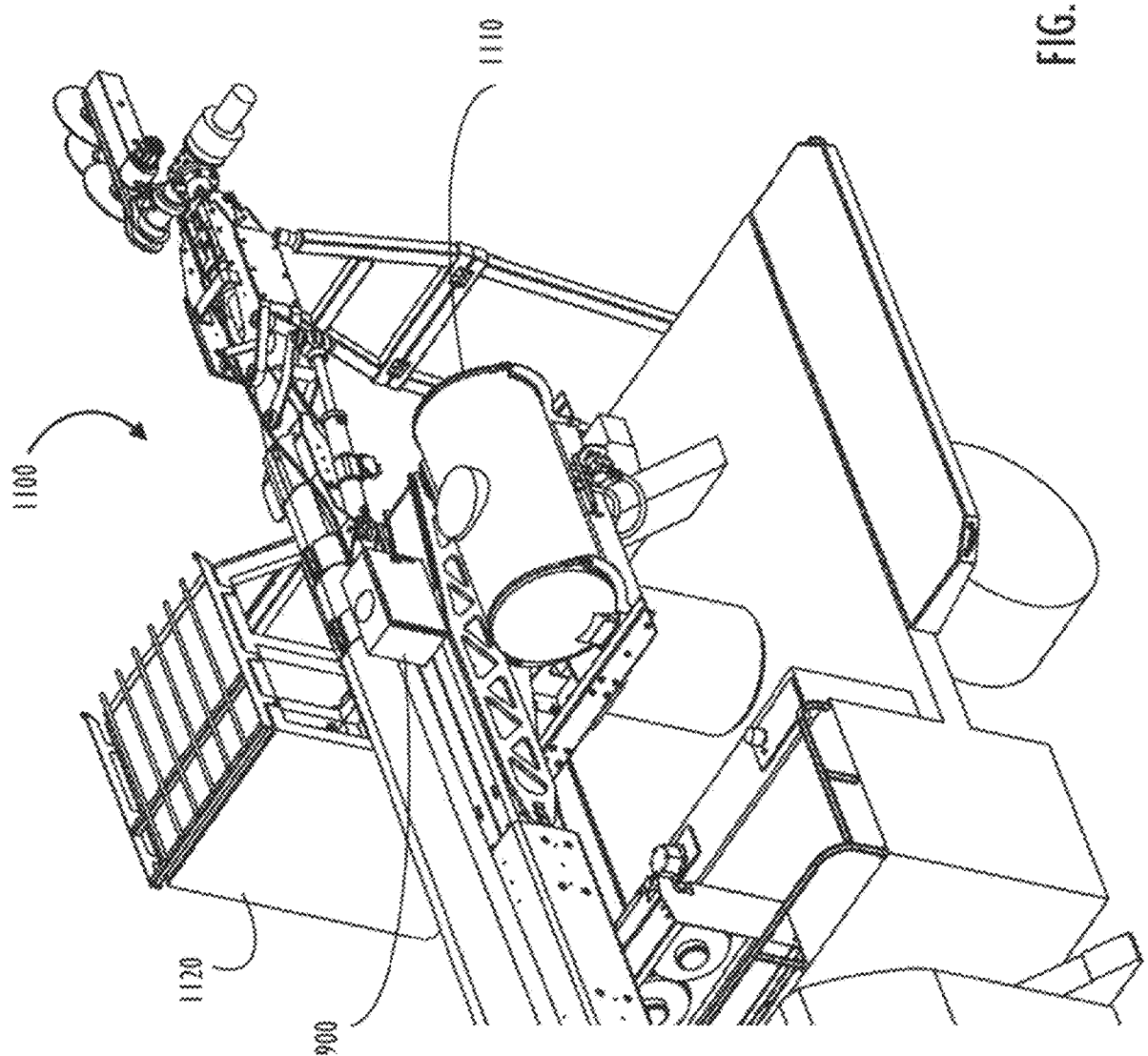
FIG. 11 illustrates the assembly of FIGS. 10A-B oriented on a transport vehicle, according to one or more disclosed embodiments.

Referring now to FIG. 11, a rear portion of a transport vehicle 1100 is shown. Another example of a protected operator cab 1120 is shown. Also, a high volume tank 1110 is shown. High volume tank 1110 may either be independent of tank 910 or used in conjunction with tank 910. However, when high volume tank 1110 and tank 910 are in fluid connection electrical insulation of boom 130 may be lost. Therefore, tanks 910 and 1110 may only be used in connection when taking this consideration into account. Obviously, tank 1110 could be used to periodically refill/clean tank 910 or contain liquids unrelated to tank 910.

Also, tanks 910 or 1110 could be used for automated cleaning of saw blades and other cutting apparatus prior to moving to a subsequent tree. For example, a chlorine based cleaning of cutting apparatus may be required to prevent spreading of diseases amongst trees (e.g., oak wilt disease). Additionally, other site specific requirements may exist and location of tank 910 allows for precision application of sprays or wound dressings. In particular, some materials to be applied are very viscous and it may be desirable to minimize length of supply hose 1110 because of difficulty in cleaning the supply hose itself.

Figure 12A:
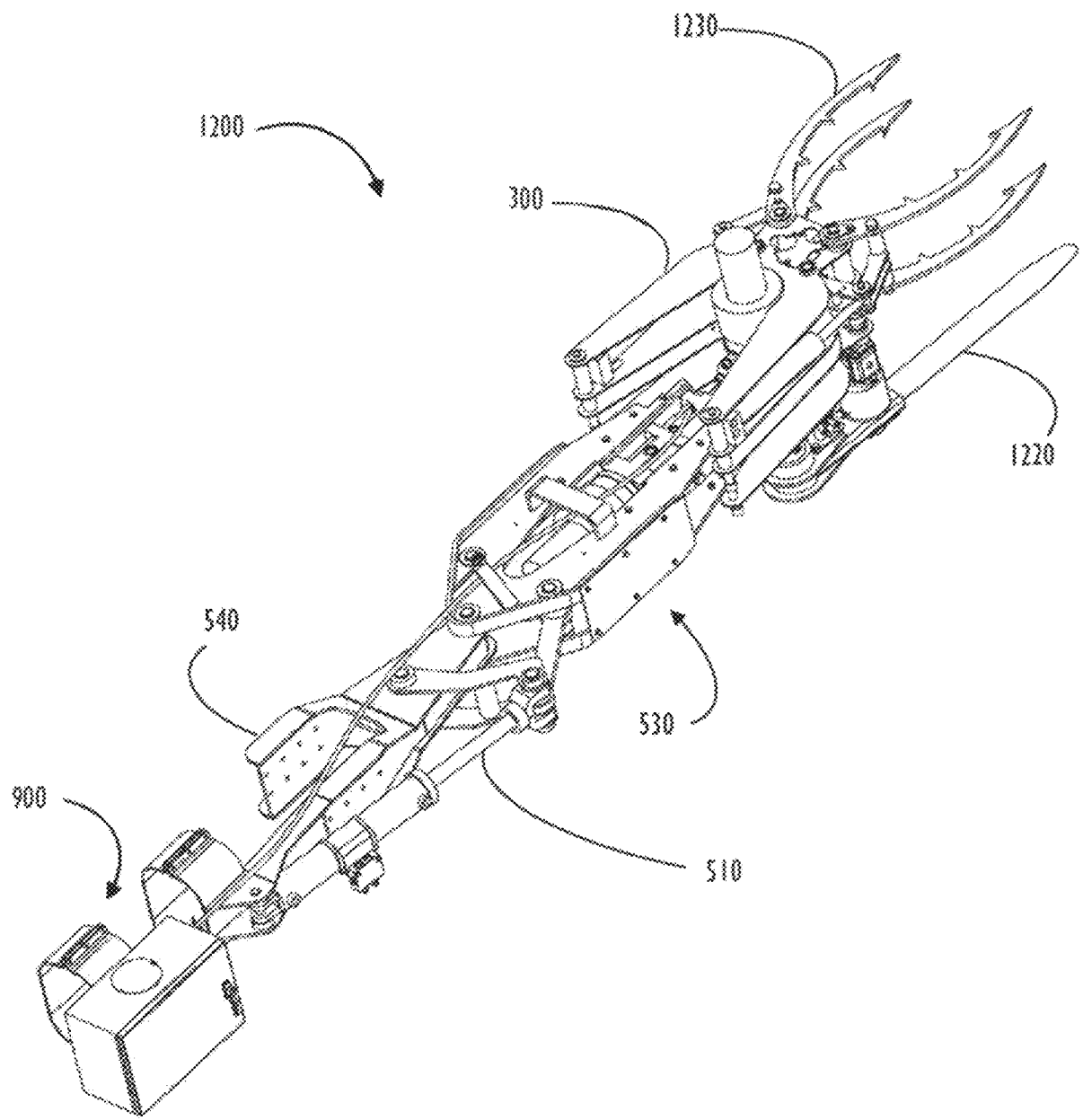
FIGS. 12A-C illustrate different perspective views of a boom assembly with a trunk clamp and chainsaw style saw bar arm, according to one or more disclosed embodiments.
Figure 12B:
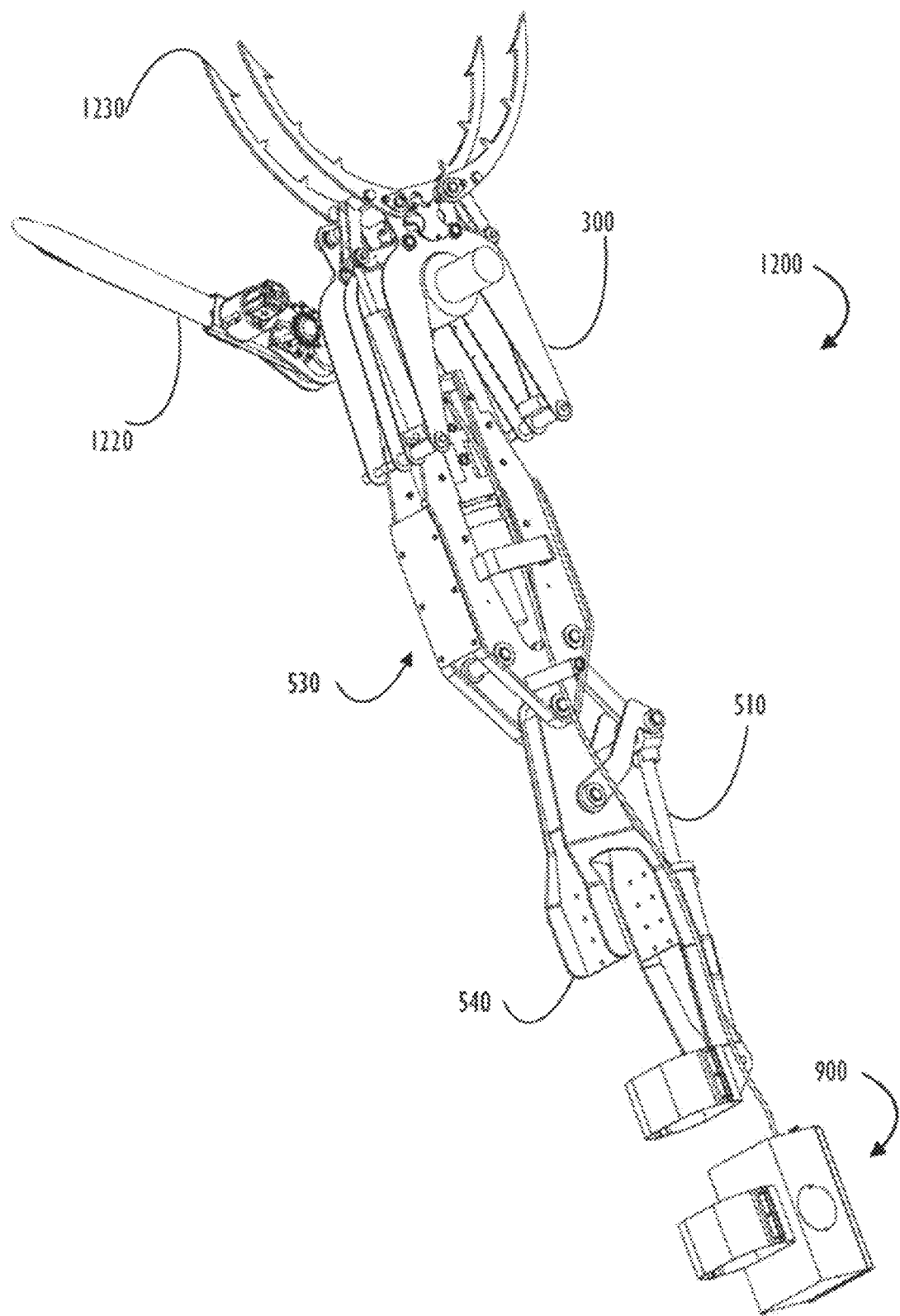
Figure 12C:
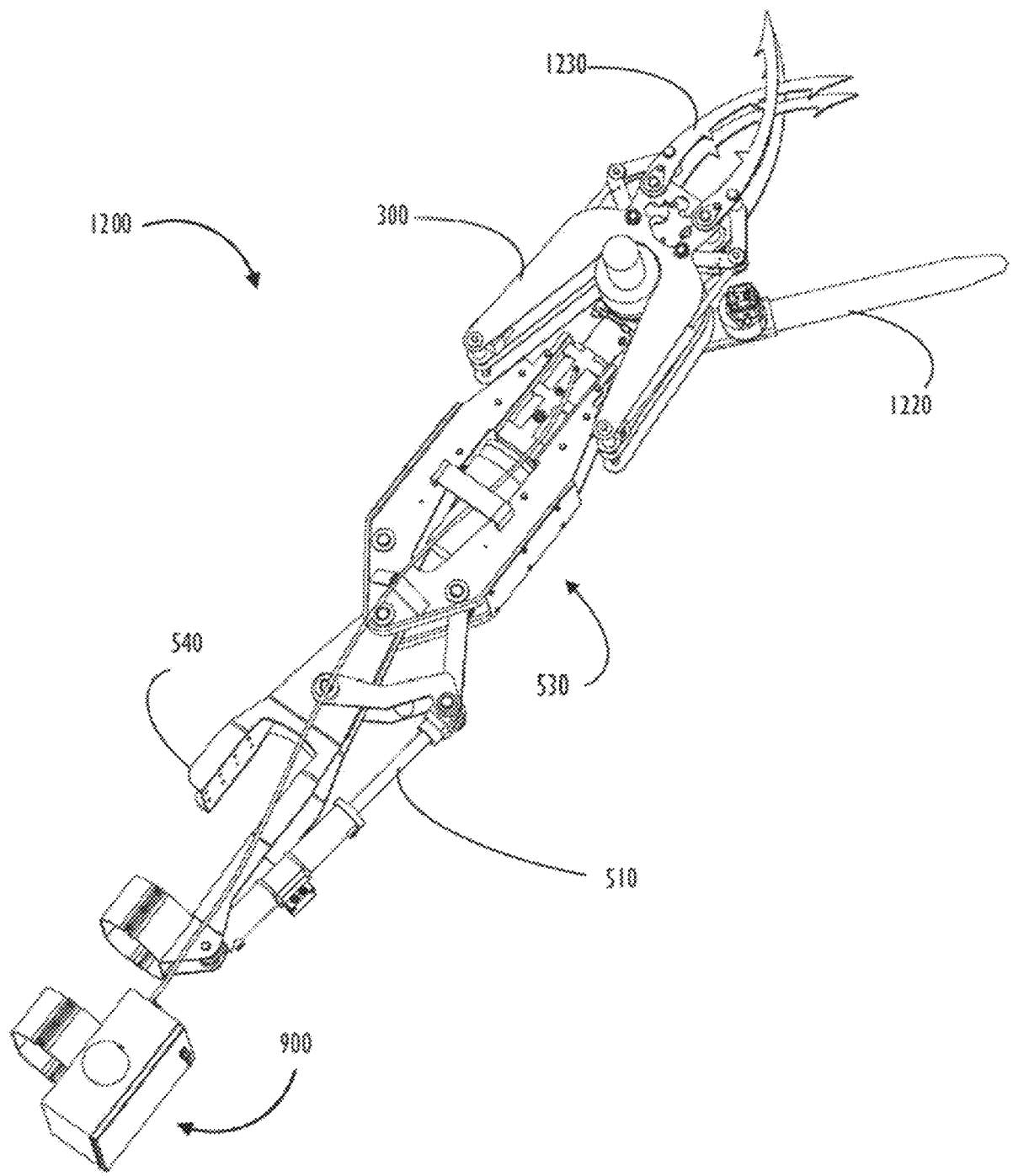

Referring now to FIGS. 12A-C, three different perspective views 1200 are shown to illustrate yet another embodiment of tree trimming apparatus 120. In this embodiment saw bar arm 410 has been replaced with a chainsaw style chainsaw bar arm 1220. Also, trunk clamp (or grapple mechanism) with opposing clamp arms 1230 has been introduced. Trunk clamp (or grapple mechanism) with opposing clamp arms 1230 is generally larger and stronger than limb clamp (or grapple mechanism) formed from opposing clamping arms 320. Using this embodiment, an operator could grasp a portion of a tree trunk with a trunk clamp (or grapple mechanism) and chainsaw bar arm 1220 under the clamped trunk portion to sever a section of trunk and safely lower the severed trunk portion to the ground. Thus, entire portions of a tree trunk could be removed from the top of the tree to the bottom of the tree. Note, the length and diameter of each trunk portion (based on the type of wood) could be varied to take into consideration weight capacity of boom 130. Also, in certain situations, vary large limbs could be removed utilizing trunk clamp (or grapple mechanism) and/or chainsaw bar arm 1220. As is known to those of ordinary skill in the art, a chainsaw style blade could comprise an automatic tensioning capability (not shown), oil lubrication supply (not shown), and chain saw bar cover shield (not shown).

Figure 13:
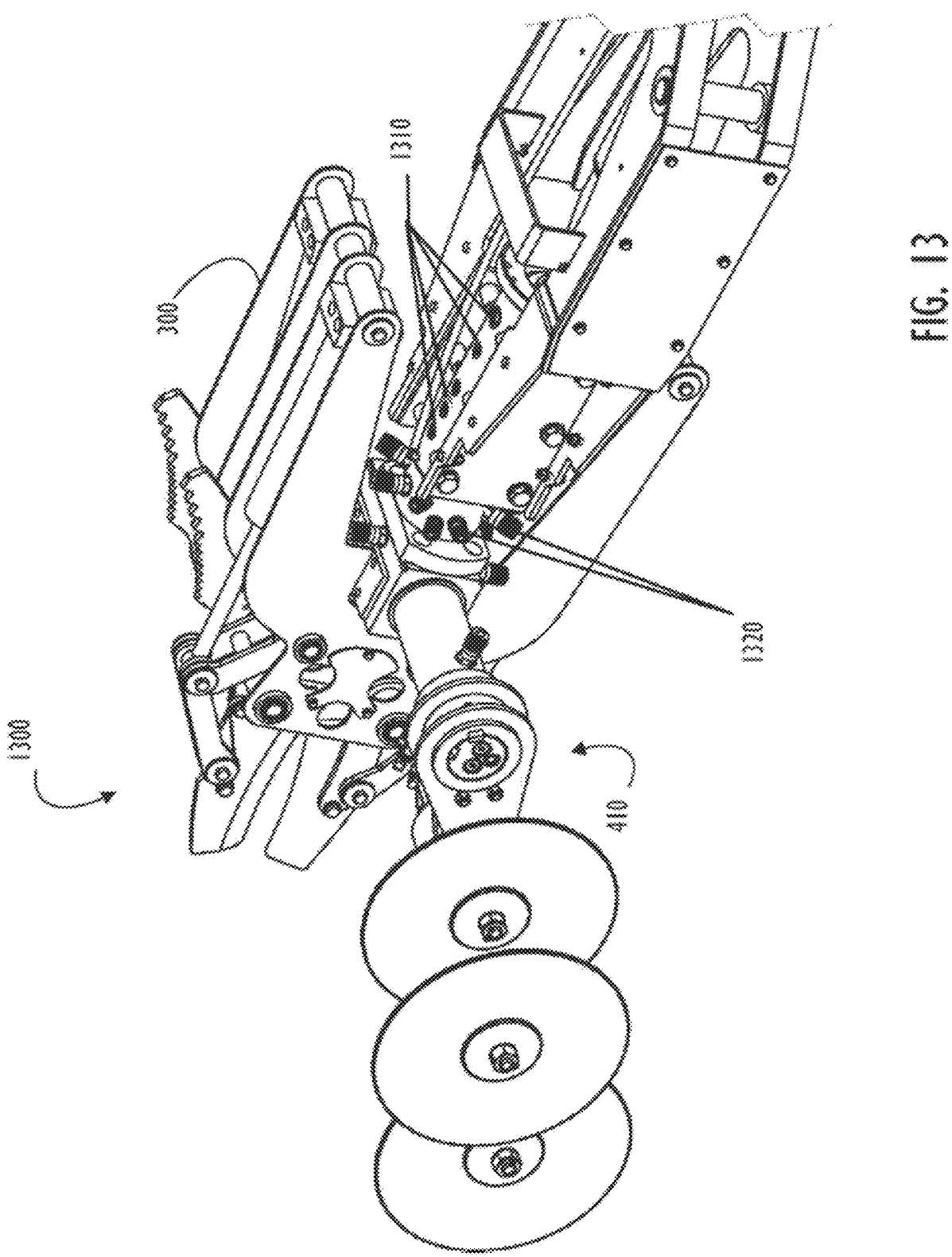
FIG. 13 illustrates hydraulic hose connections for quick connecting hydraulically powered accessories to an aerial tool assembly, according to one or more disclosed embodiments.
Figure 14:
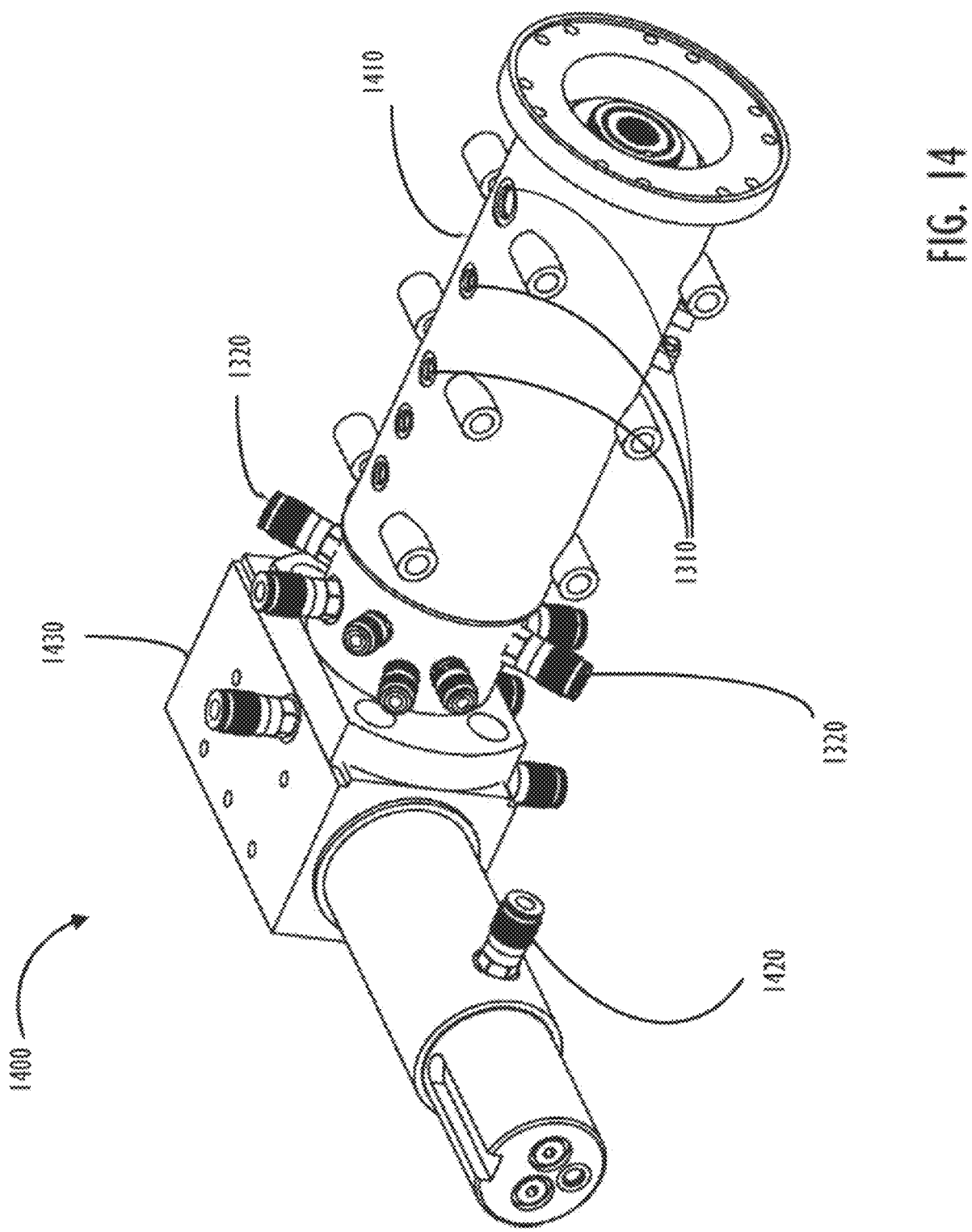
FIG. 14 illustrates a more detailed view of an axial swivel with hydraulic ports to supply hydraulic fluid conductivity through the swivel, according to one or more disclosed embodiments.

Referring now to FIGS. 13 and 14, quick connect/disconnect sealable fluid connections configured to provide power via pressure and flow volume through a ported axial swivel are shown. View 1300 of FIG. 13 shows hydraulic hose fluid input ports 1310 and corresponding quick connect/disconnect hydraulic hose connection ports 1320 leaving the other side of the axial swivel and allowing for the connection to the corresponding ports on the saw bar swivel and aerial tool assembly 300, limb clamps in the form of opposing clamping arms 320, and limb shear 310 cylinders. Ports 1310 and 1320 may be referred to as "swivel ports" to indicate they are ports on the axial swivel. Hydraulic hoses are not shown so that details of the swivel may be seen.

As explained above, each aerial tool configured accessory attached to the far side of axial rotator connection 430 may be individually powered by one or more hydraulic or pneumatic channels through the axial swivel. Axial rotator connection 430 is an example of an axial swivel. View 1400 of FIG. 14 shows axial swivel outer casing 1410, a quick connect/disconnect male hose fitting 1420, and a saw bar swivel 1430. In accordance with one example, FIG. 14 shows the quick connect/disconnect hose fittings on the axial swivel that will connect via hoses to the corresponding quick connect/disconnect hose fittings on the saw bar swivel. The use of quick connect/disconnect sealable fluid connections such as 1320 allow for quick removal/installation of the various tool configurations without fluid loss. Quick connect/disconnect sealable type couplings are sometimes referred to as "push to connect" couplings because a male and a female adapter are simply pushed together to lock in place. The resulting sealable coupling creates a dependable fluid (or air i.e. pneumatic) connection. To remove a coupling of this type (i.e., quick disconnect) an outer ring sleeve is typically pulled against a spring and the male/female adaptors may then be separated. Further examples and details of sealable quick connect/disconnect "QD Couplings" H, IH & P Series Snap-Tite product information guide and "Instrumentation Quick Coupling Products" Catalog 4220/USA of April 2008, both submitted in an IDS at the time of filing, each of which is incorporated by reference in its entirety.

Additionally, as mentioned above, aerial tool assembly 300 may be configured or reconfigured in the field with attachments as opposed to having a permanently "fixed" factory configuration. A quick connect/disconnect type of connection that "clicks" into place may allow an operator to completely replace, modify, add or reduce from or to the aerial tool configurable assembly in a form to be appropriate for a given application. Several options for field configuration are available such as: attaching and disconnecting saw arm attachment 410 at axial connection 420; attaching and disconnecting the complete aerial tool assembly 300 at the interface to the axial rotator connection 430; and/or disconnecting the aerial tool assembly including axial rotator connection 430 at aerial tool assembly mounting bracket 530. Aerial tool assembly 300 may also be connected or disconnected from axial connection 420 (e.g., see FIG. 10A) thereby providing the saw bar assembly as another possible aerial tool configuration.

Aerial tool assembly 300 may also be connected or disconnected at axial rotator connection 430 or at aerial tool assembly mounting bracket 530. FIG. 12B shows the trunk clamp or grapple mechanism with a plurality of opposing clamping arms 1230 and chainsaw bar arm 1220 as an aerial tool configuration that may be connected or disconnected as a complete assembly from axial rotator connection 430 or at aerial tool assembly mounting bracket 530. Each aerial tool configuration disclosed herein may include its own dedicated power connection(s) as further described as hydraulic, pneumatic, or a non-hydraulic or pneumatic self-contained independent power source (e.g., electric, electric rechargeable battery pack, engine, or water/chemical pump) or any combination thereof specific to the desired aerial tool configured assembly(s).

Figure 3A:
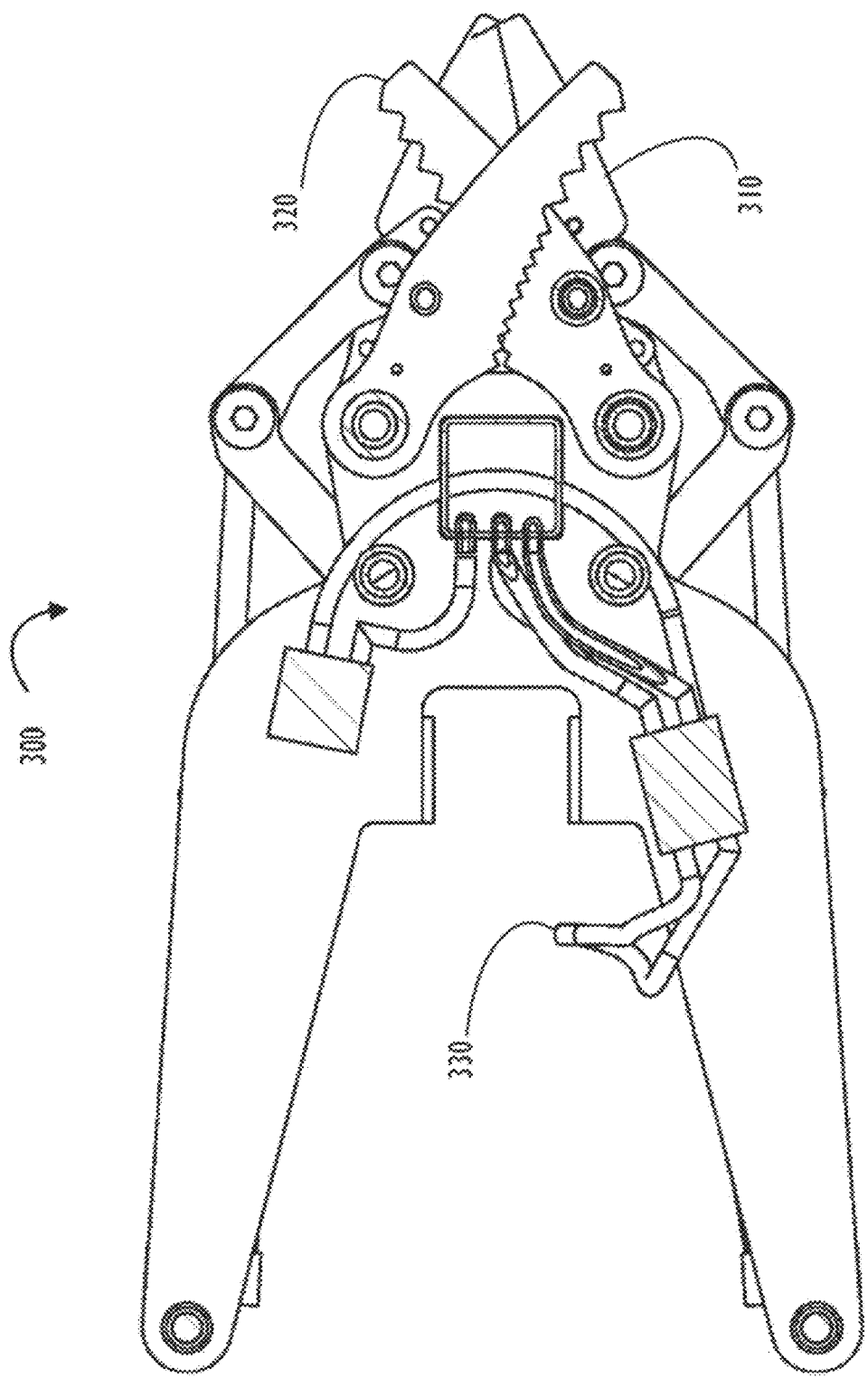
FIGS. 3A-D illustrate, in different perspective views, a possible configuration of an aerial tool assembly which may be connected, usually through a boom actuator and attachment assembly, to a boom of a ground based vehicle, according to one or more disclosed embodiments.
Figure 3B:
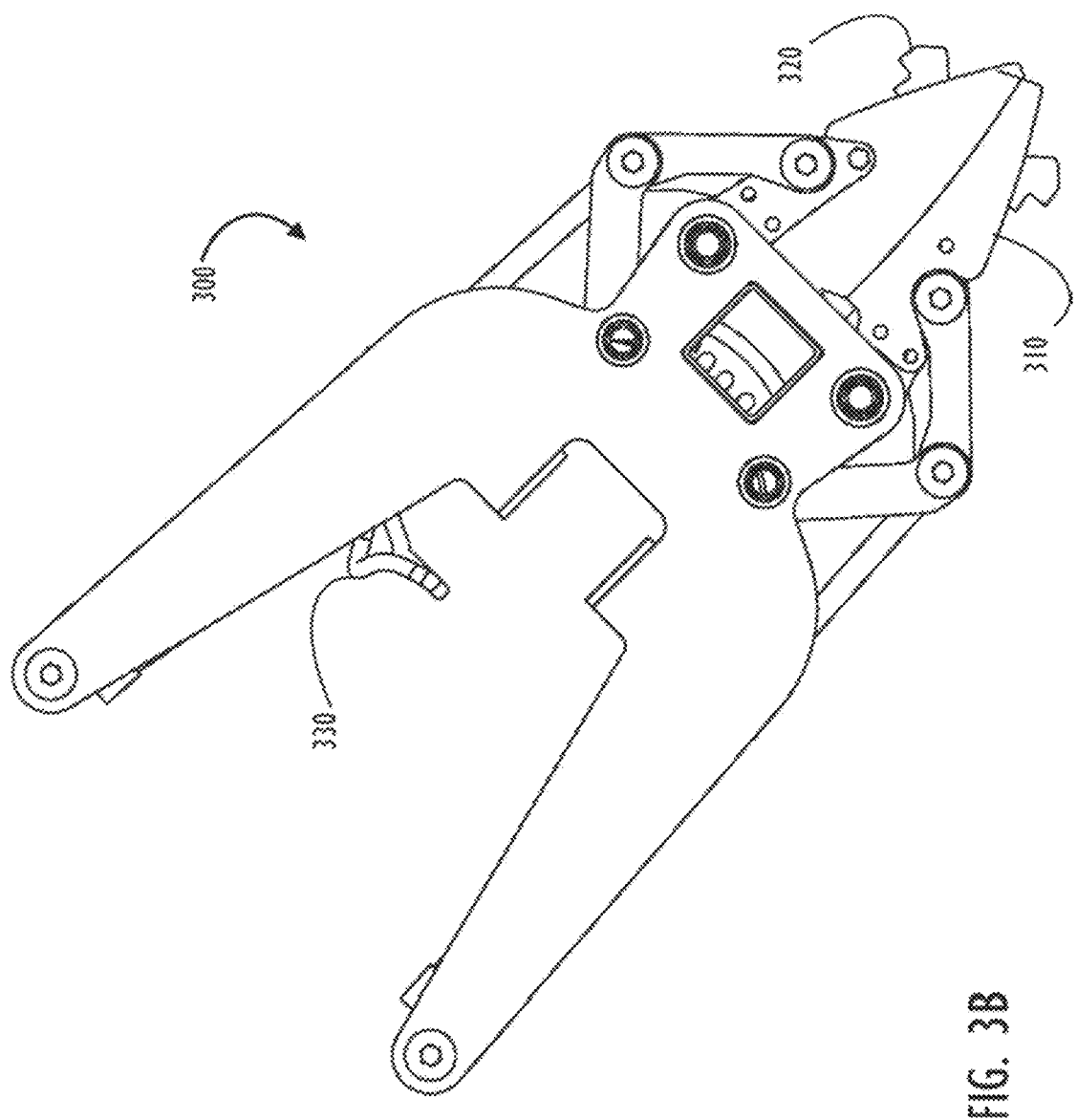
Figure 3C:
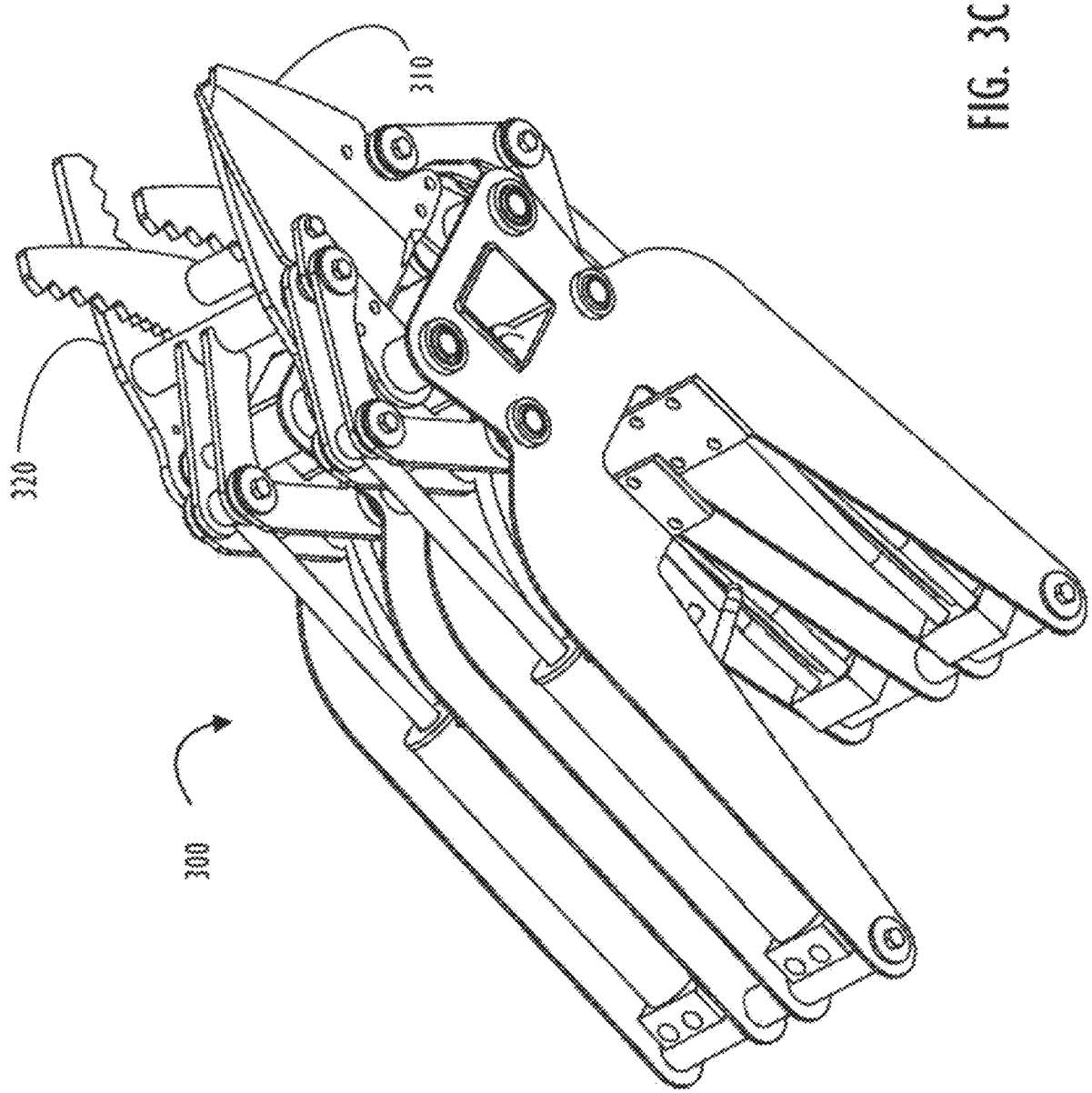
Figure 3D:
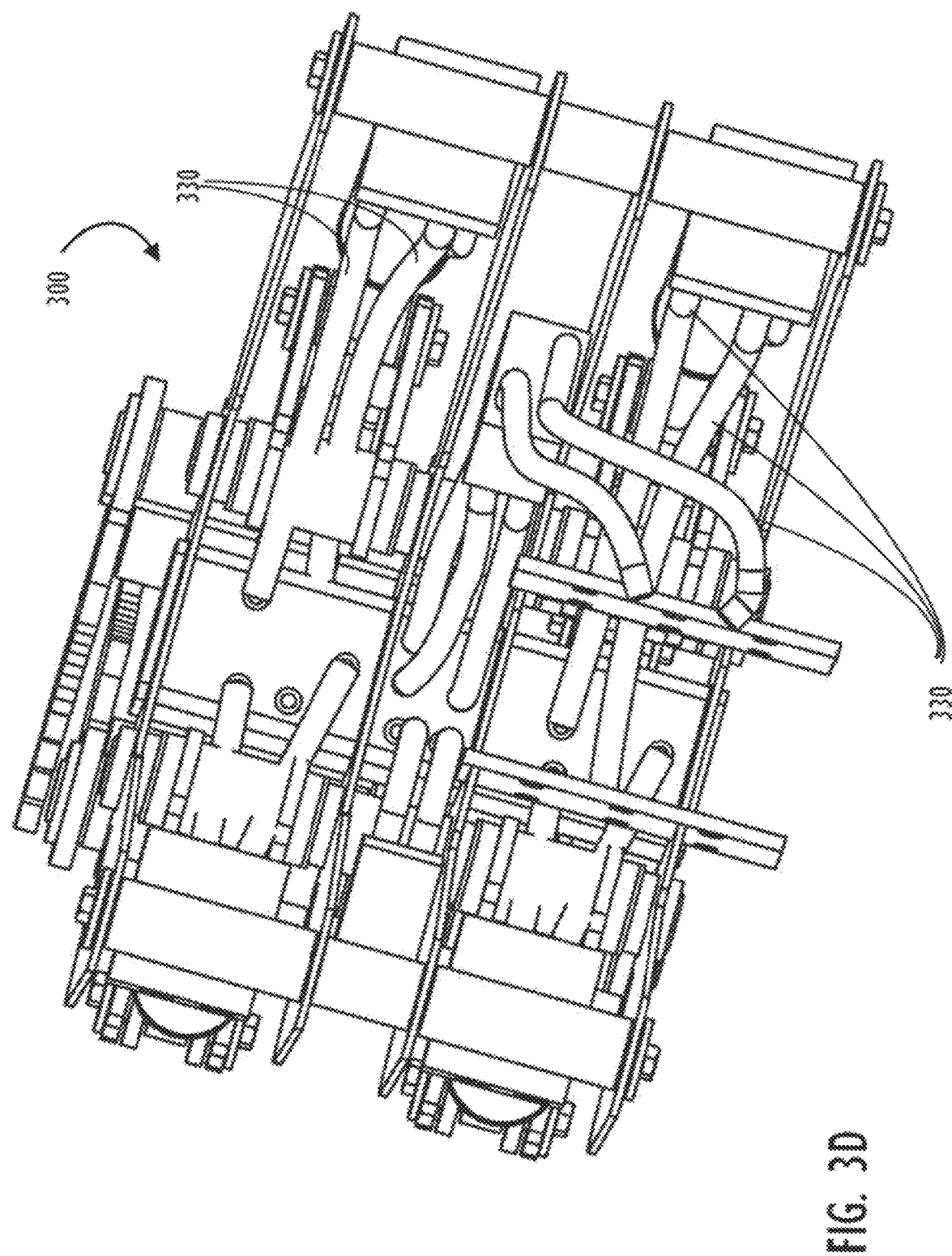

Furthermore, each aerial tool configuration may also be mechanically attachable and detachable to and from each other via a bolted, pinned, hinged, latching, coupling, interlocking, keyed or any other suitable mechanical connection device for the attaching and detaching of a complete one or more aerial tool configured boom assembly. For example, FIG. 3A shows aerial tool assembly 300 configured as a limb shear 310 with a plurality limb clamps in the form of opposing clamping arms 320 with a plurality of opposing clamping arms both being attachable and detachable from each other or attached and detached as a combined assembly. The Quick connect/disconnect type sealable hydraulic or pneumatic connections may also allow for ease of complete or partial replacement, reconfiguration, maintenance and or storage or transporting of attachable and detachable tool components or complete configured aerial tool assemblies (such as aerial tool assembly 300).

In another example, the entire aerial tool assembly 300 may be disconnected and replaced with other assemblies to alter capabilities of the specially designed boom 130. Recall that boom 130 has load bearing quick connect/disconnect multi-port swivels at each of axial rotator connection 430 and axial connection 420. Load bearing multi-port quick connect/disconnect swivels that allow axial rotation in several different planes and allow for independent fluid pass through are not utilized in prior art aerial tree trimming applications. Furthermore, disclosed connections at the far end of the boom may allow a flexible type of apparatus that could transform in the field from a hydraulic or pneumatic powered aerial tool configuration to an aerial tool configuration that has a dedicated independent power pack. As mentioned above, the entire aerial tool assembly 300 including axial rotator connection 430 may be disconnected at aerial tool assembly mounting bracket 530 and replaced by an aerial tool configuration with an independent power pack.

Figure 15A:
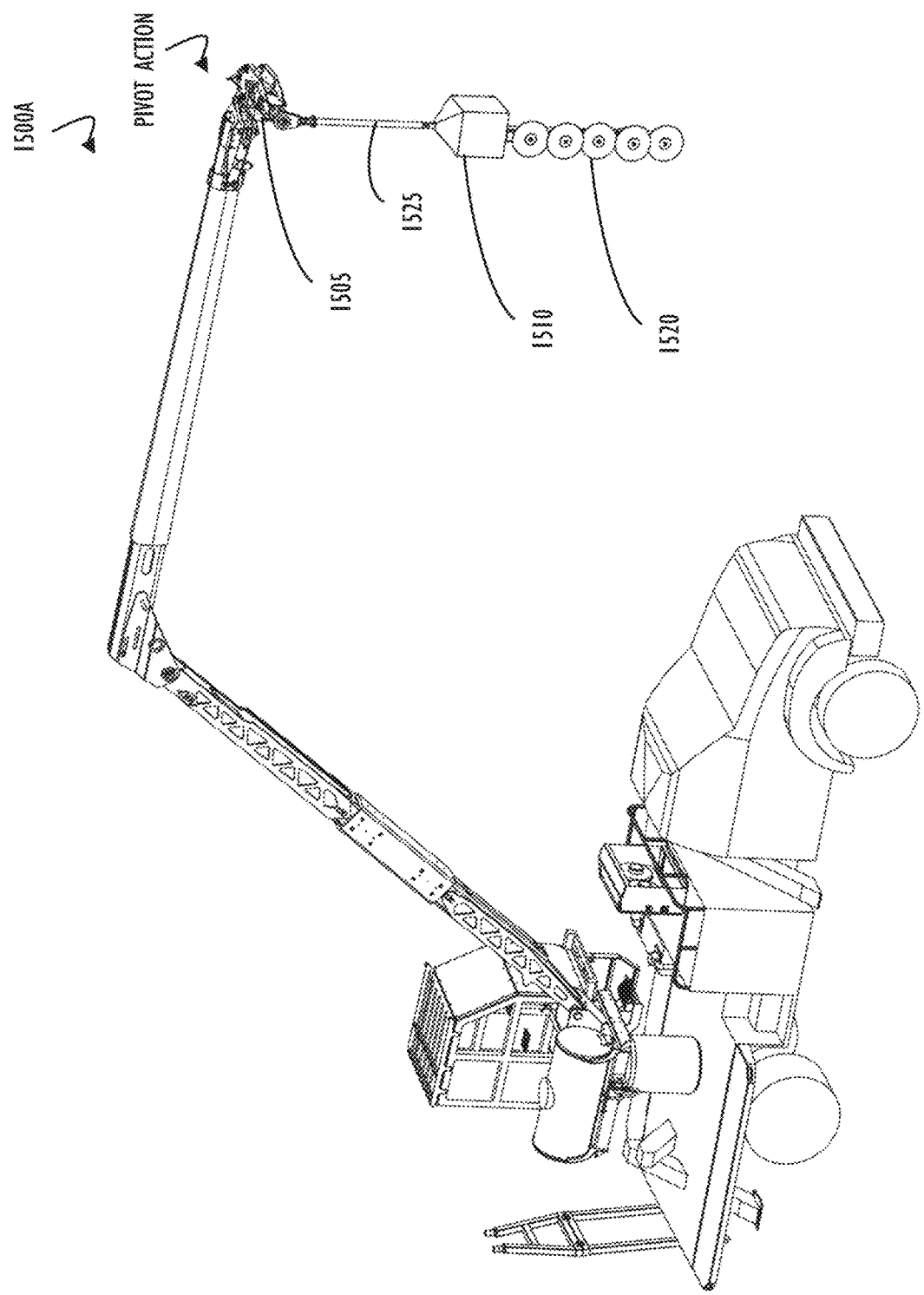
Figure 15B:
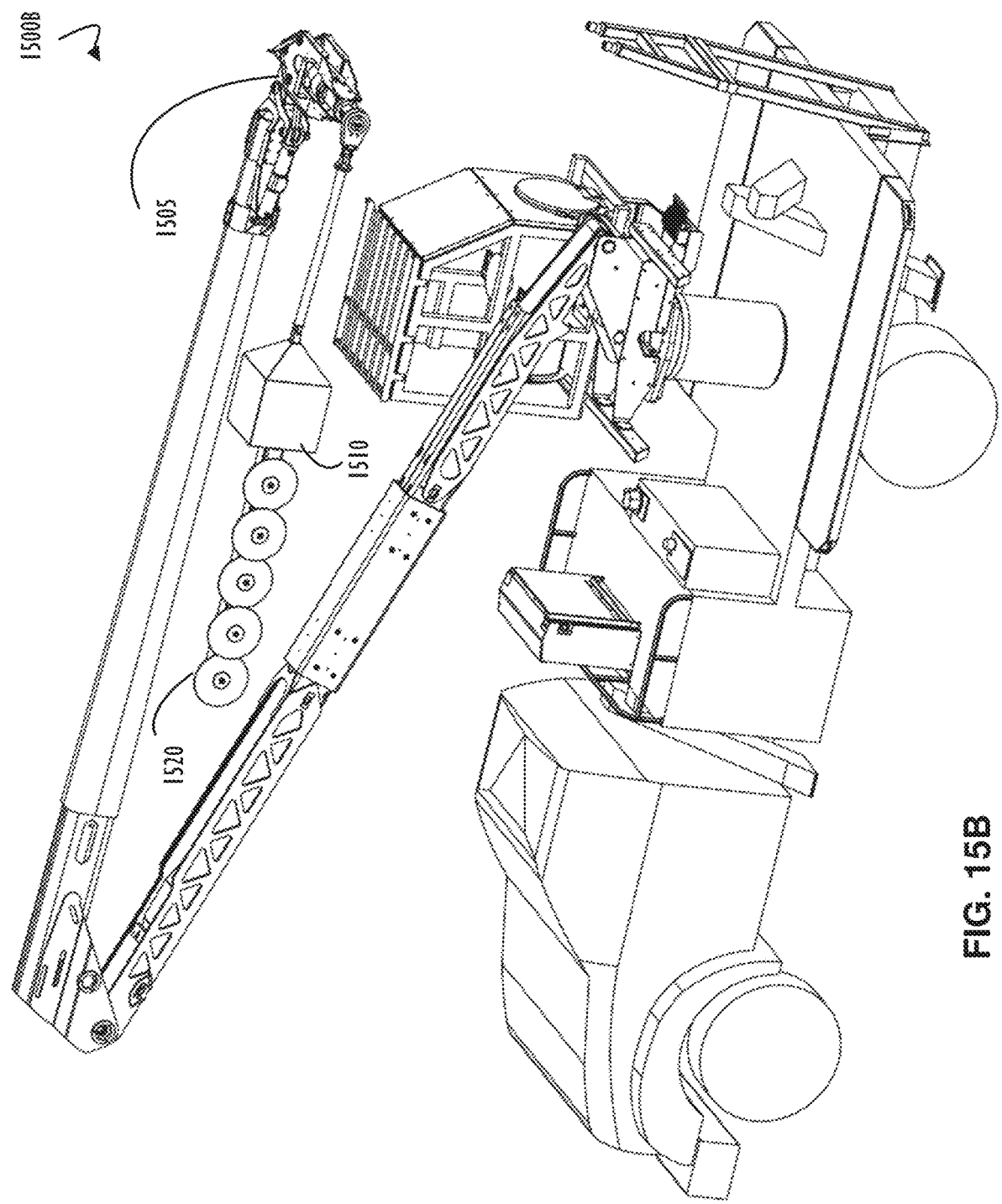

Referring now to FIGS. 15A-C, view 1500A illustrates an aerial tool configuration for a self-contained power supply 1510 and multi-circular saw blades 1520. The aerial tool configuration of this example includes an attachment mechanism to connect at aerial tool assembly mounting bracket 530 and may include an anti-sway pole 1525, according to one or more disclosed embodiments. As illustrated, in this example configuration anti-sway pole 1525 may be an aluminum pole with a distal end connecting an alternative self-contained engine driven or rechargeable battery pack power supply 1510. Additionally, there is illustrated a connected saw bar comprising multi-circular saw blades 1520. The connection at aerial tool assembly mounting bracket 530 allows the actuator arm 510 to actuate the aerial tool configuration approximately 90 degrees in either direction to provide a pivot action. Additional views from different angles are shown as view 1500B and view 1500C.

Power supply 1510 may include a wireless remote receiver (not shown). For example, a wireless remote receiver may be provided to receive signals from a remote wireless remote control belly pack 161 to activate power supply 1510 for engaging and disengaging power to multi-circular saw blades 1520. This aerial tool configuration could also be used to modify existing tree trimmer bucket trucks by removing the existing buckets and attaching the self-contained mechanized aerial tool configuration to the original or modified bucket attachment at the end of the aerial boom. Thereby increasing the speed of cutting and improving safety by removing the man from the bucket. Truck and boom controls may be interfaced via the wireless remote-control receiver. The above referenced configuration may include a rotator/actuator 1505 (e.g., to pivot around pivot connection 520 discussed above) to rotate the aerial tool configuration in a plane parallel to the boom for storage or the aerial tool may be disconnected and stored in a tool carrier on the vehicle or other suitable tool storage location.

Figure 16A:
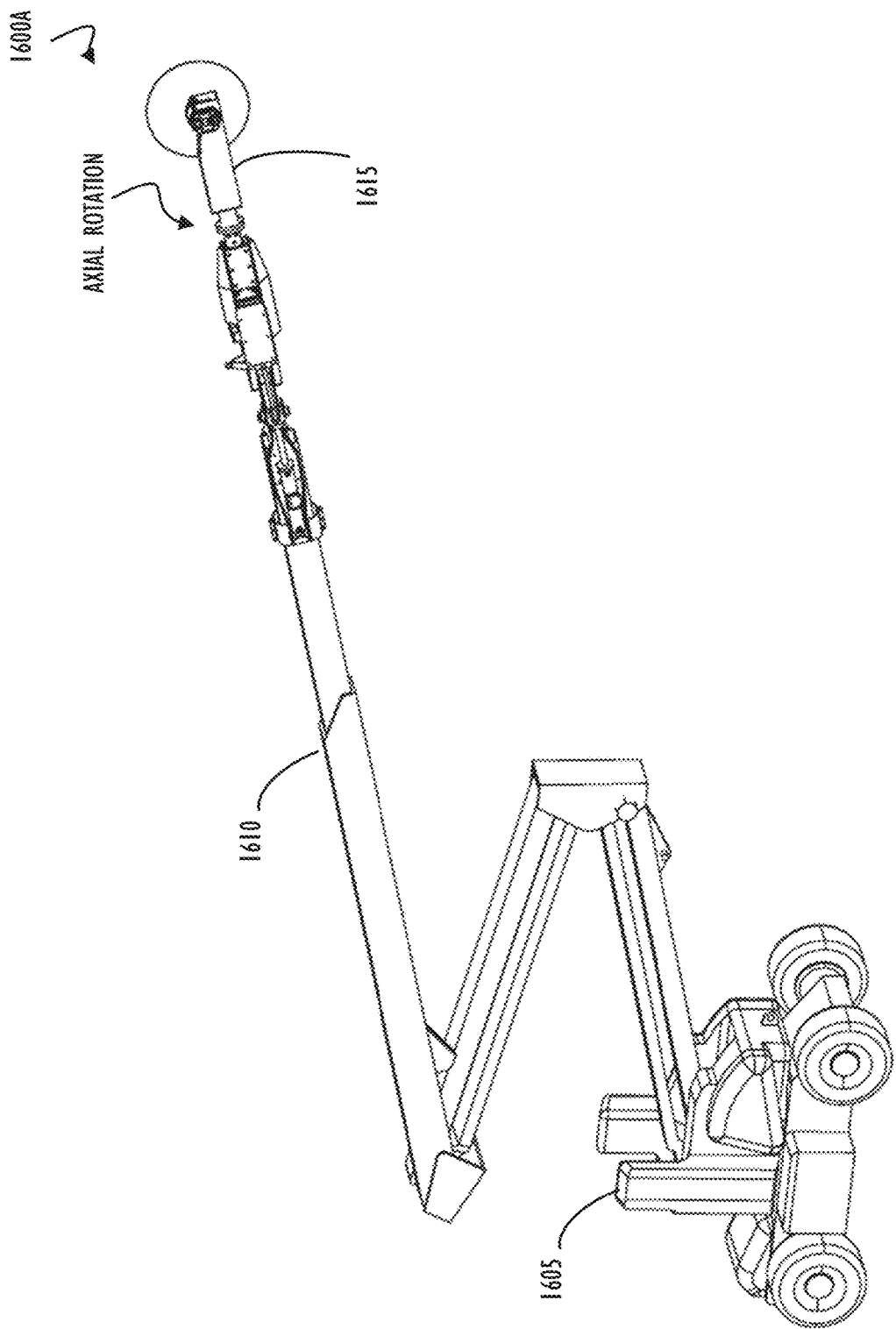
FIGS. 16A-C illustrate different views of an unmanned remote controlled vehicle and boom assembly having an attachable and detachable aerial tool configuration comprising a single circular saw blade, according to one or more disclosed embodiments.
Figure 16B:
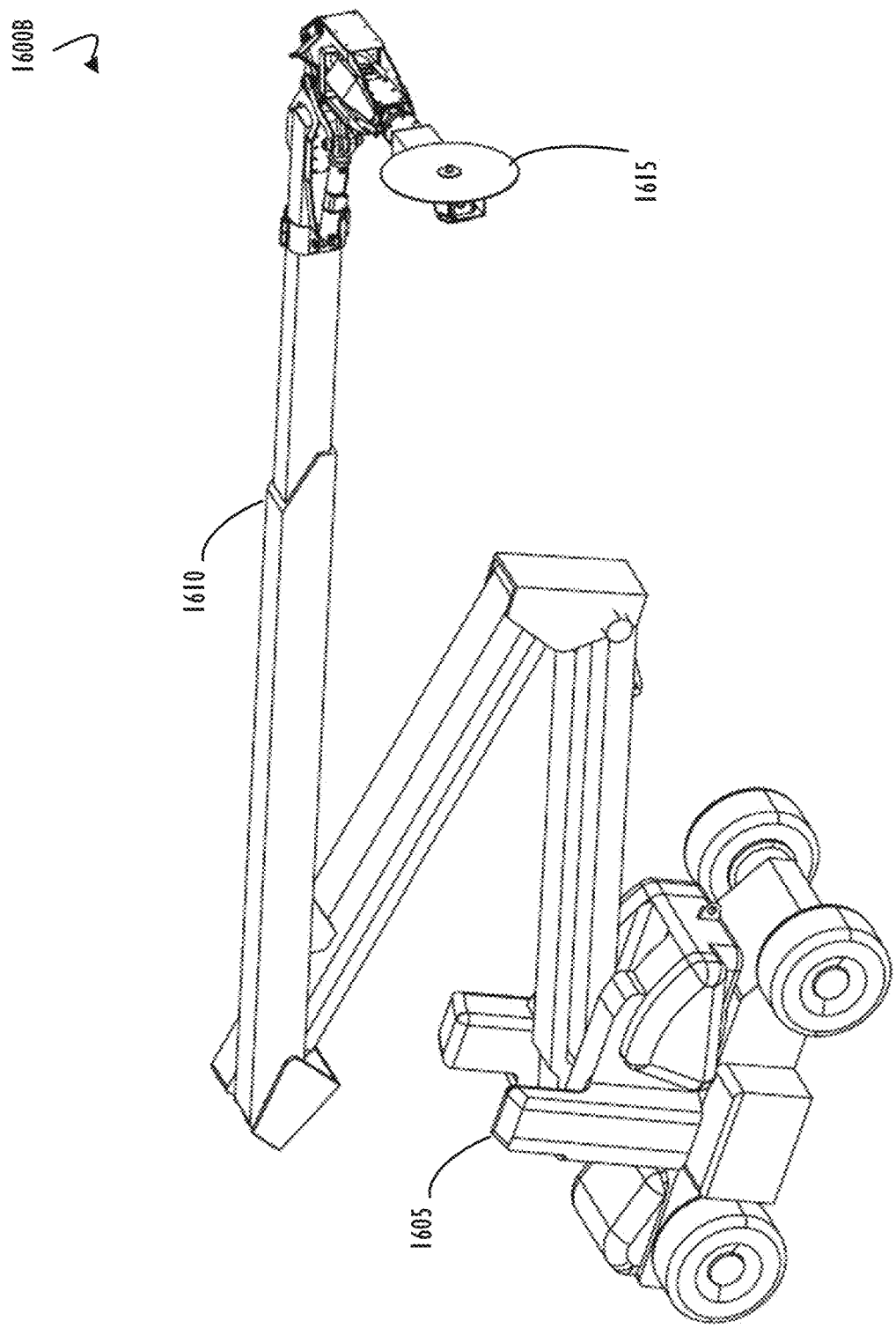
Figure 16C:
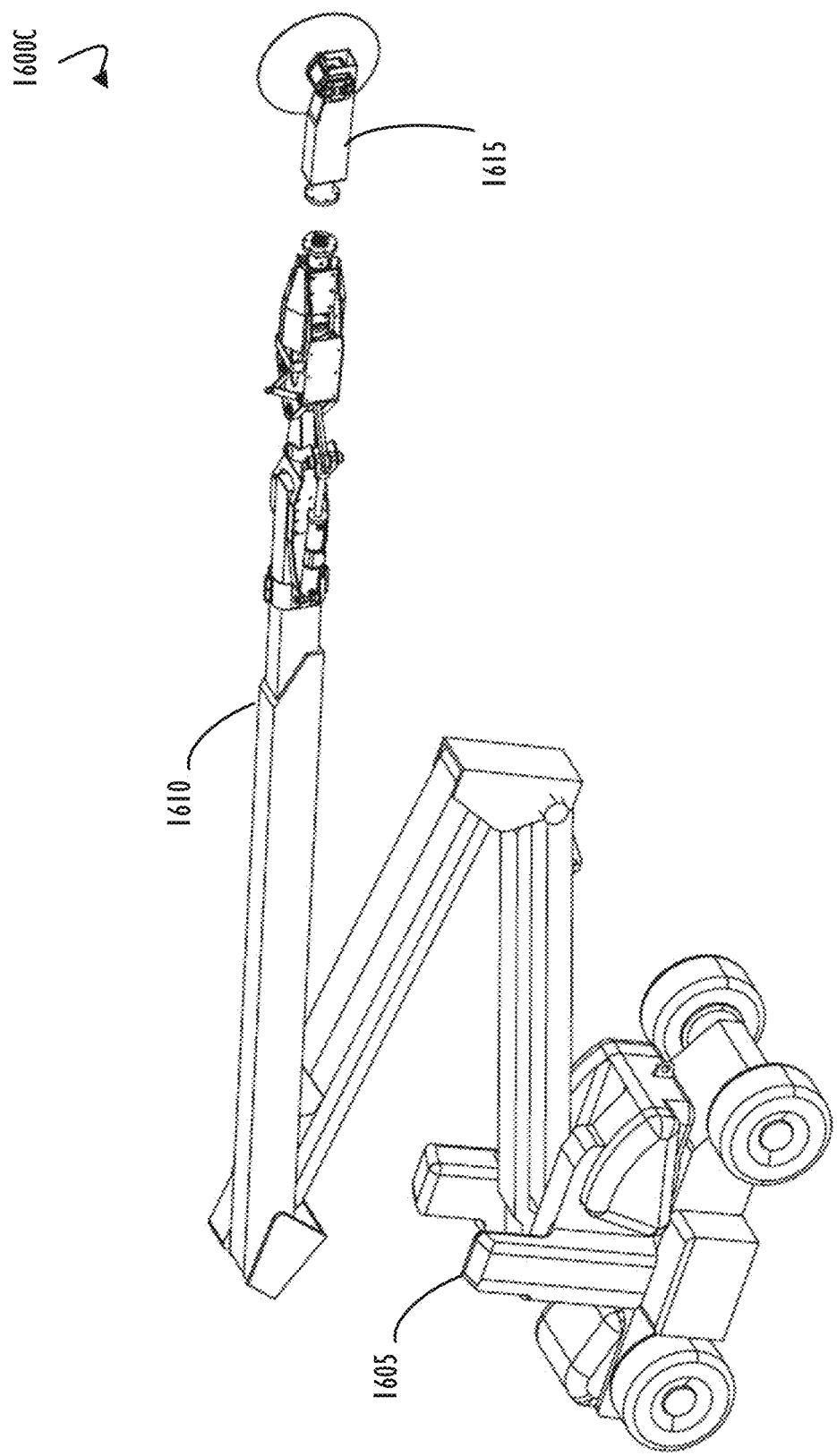

Referring now to FIGS. 16A-C, view 1600A introduces an unmanned vehicle 1605 and aerial boom 1619 configuration that is operated by a wireless remote control belly pack 161. The aerial tool assembly 300, in this example, includes an attachable and detachable single circular saw blade and motor 1615 attached to an axial rotator connection (e.g., an axial rotator connection 430 as previously discussed). Views 1600B and 1600C illustrate different perspective angles. Note in view 1600C singular circular saw blade and motor 1615 is illustrated as detached from its connection point.

Figure 17A:
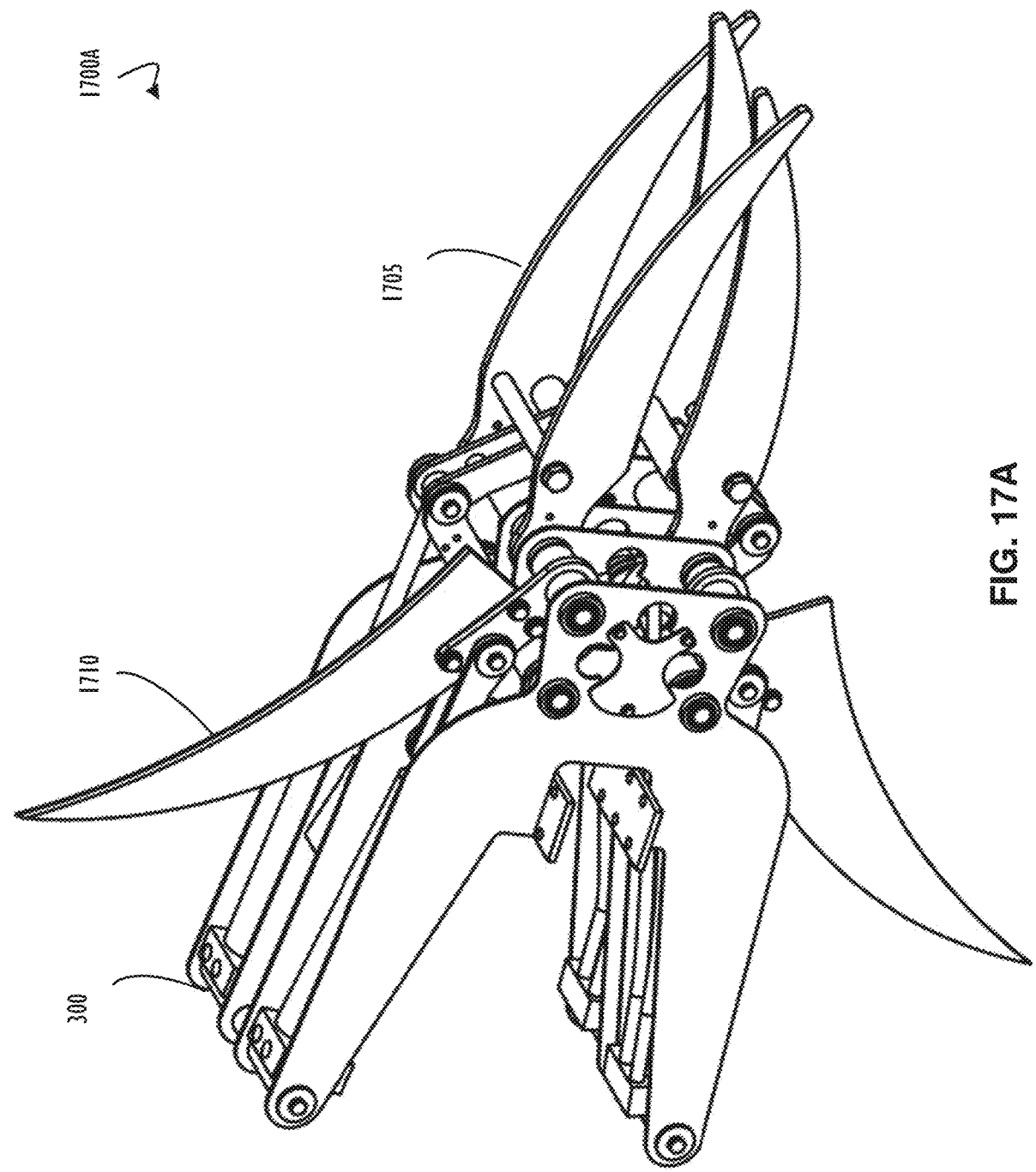
FIGS. 17A-C illustrates different views of an attachable and detachable aerial tool configuration comprising a demolition shear and grapple that may be attached to a mobile carrier with boom assembly, according to one or more disclosed embodiments.
Figure 17B:
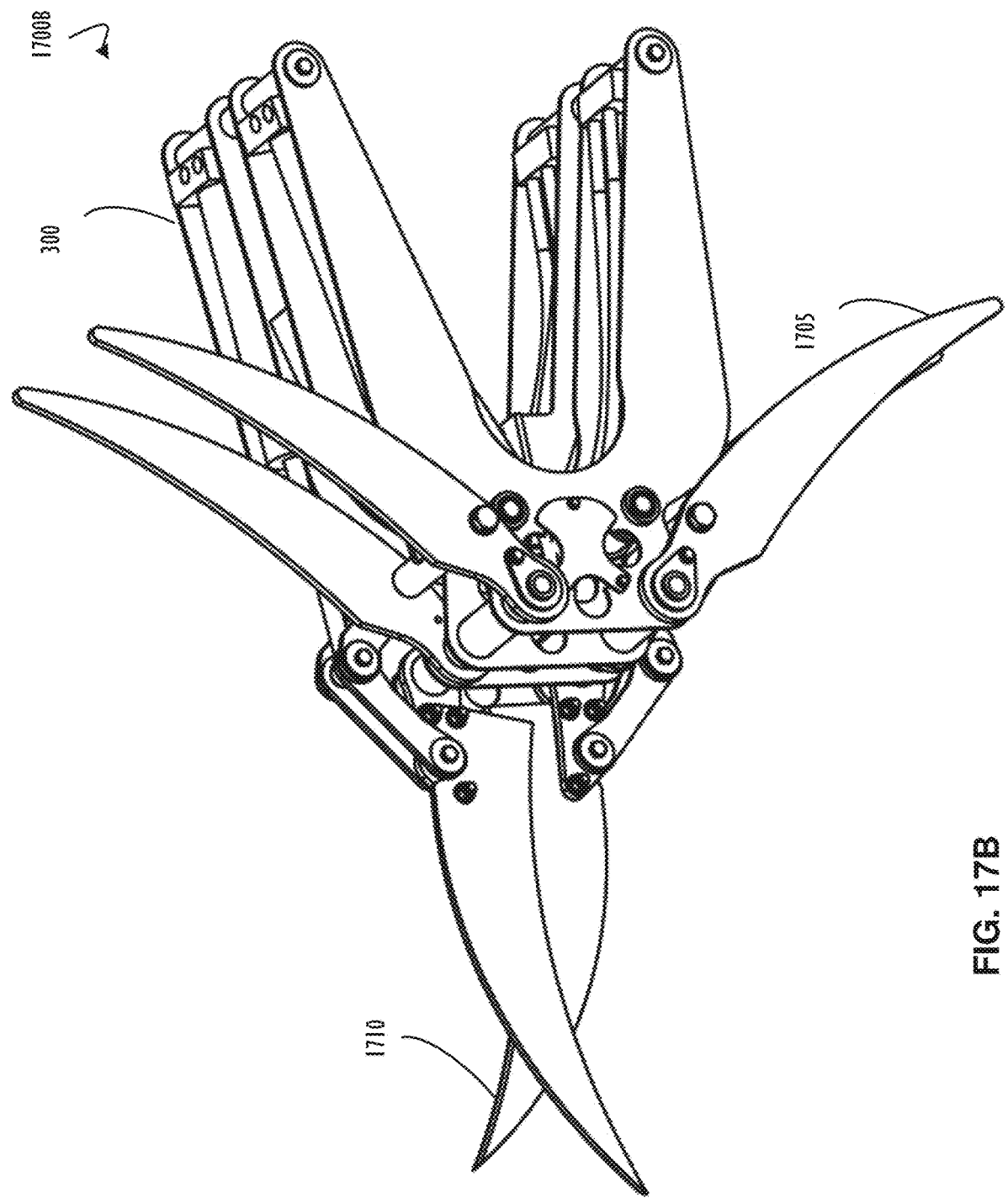
Figure 17C:
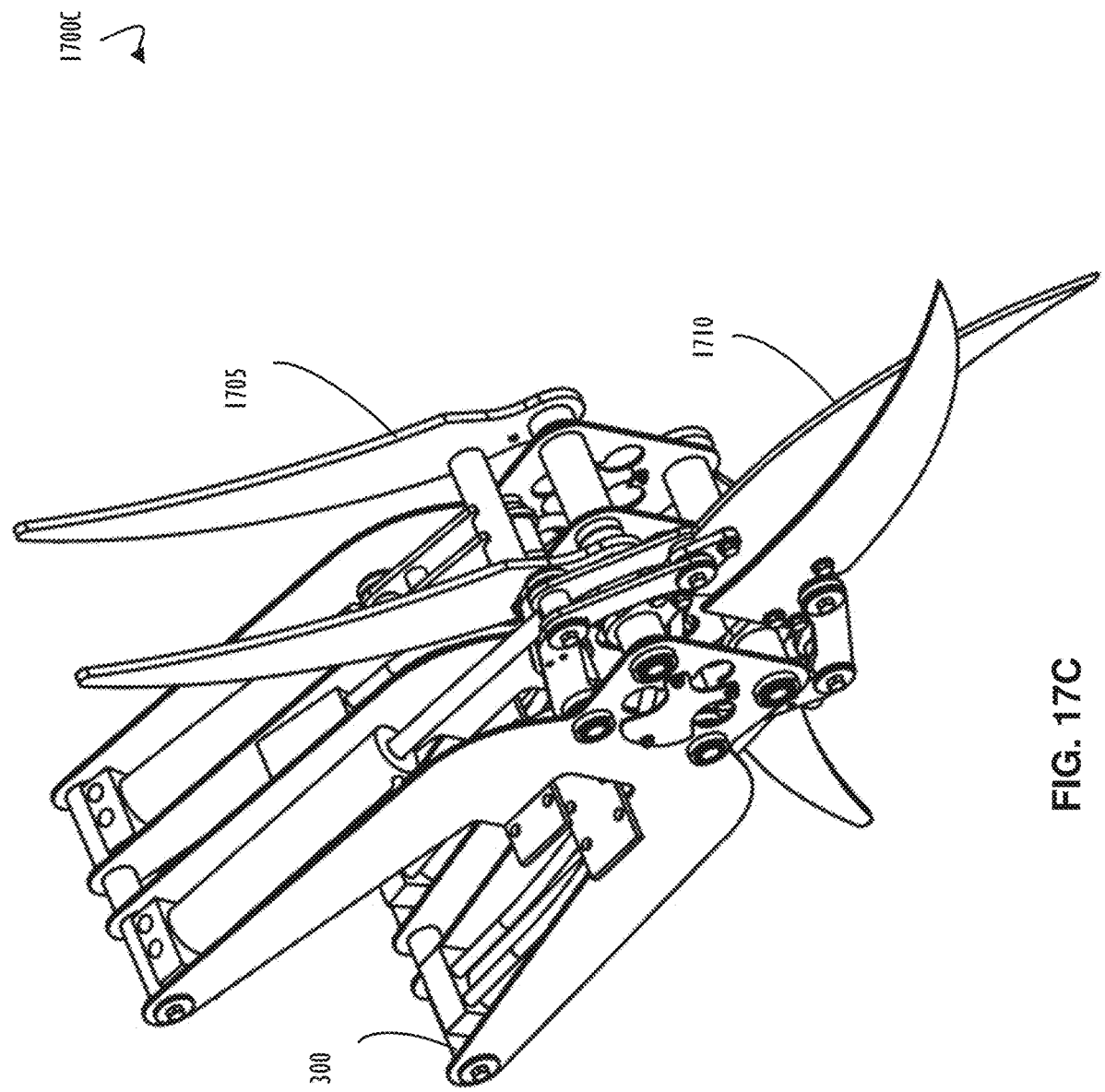

Referring now to FIGS. 17A-C, aerial tool assembly 300 is illustrated in view 1700A to include an attachable and detachable industrial demolition shear with opposing cutting blades 1710, interchangeable jaws and an attachable and detachable grapple with opposing clamping arms 1705 may be further used for different configurations of aerial tool assembly 300. Note that clamping arms 1705 are illustrated without gripping teeth in this example, in part, because cutting soft metals (e.g., aluminum) may require a clamp that will not bite into the metal. For example, if demolishing an airplane, it may not be desirable for cut portions to stick to teeth of a clamping mechanism. View 1700A and view 1700B illustrated different perspective angles.

Figure 18:
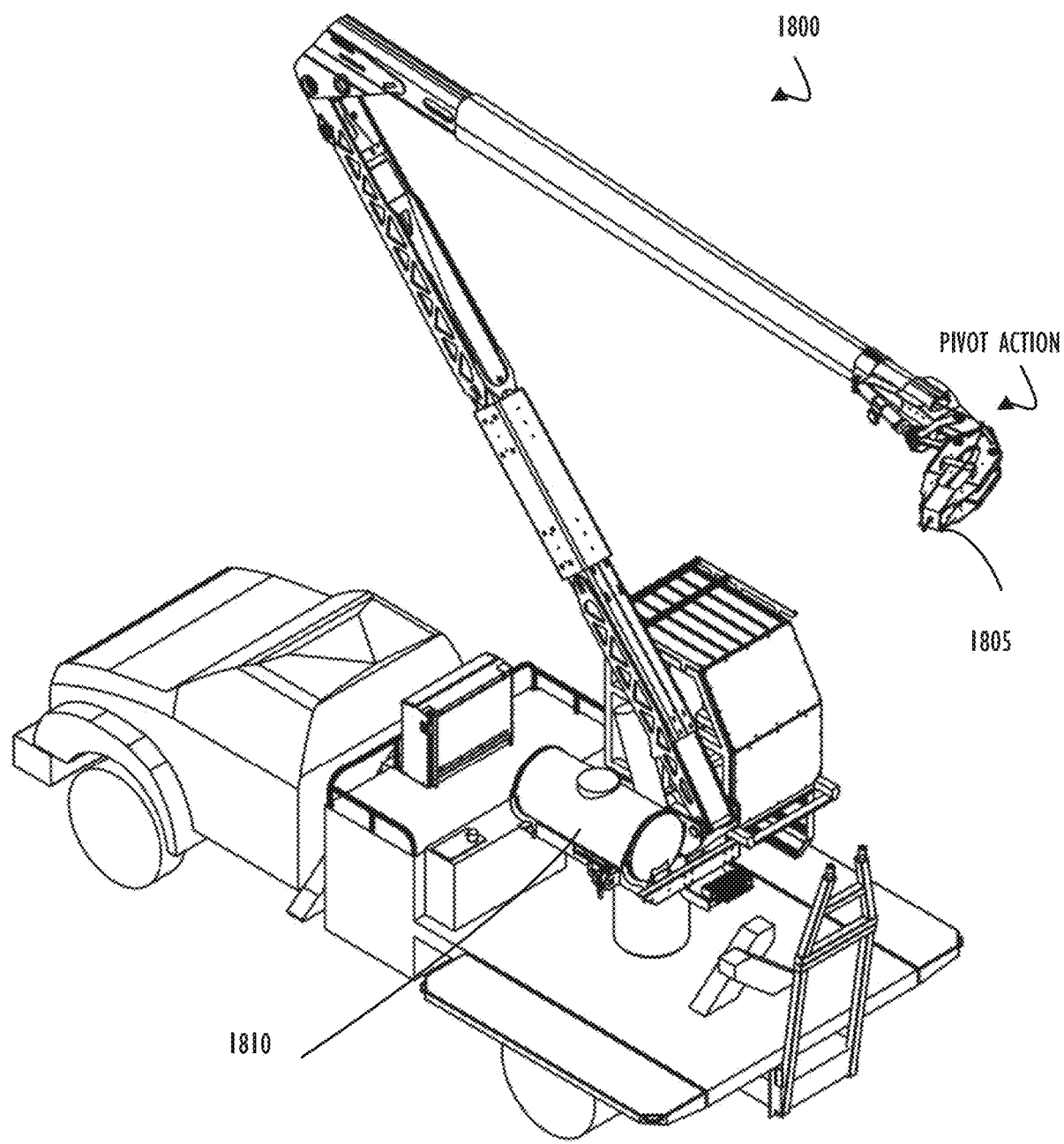
FIG. 18 illustrates a truck and boom assembly with an attachable and detachable aerial tool configuration comprising a water/chemical blasting spray head, according to one or more disclosed embodiments.

Referring now to FIG. 18, view 1800 illustrates that aerial tool assembly 300 may have been disconnected and removed at aerial tool assembly mounting bracket 530 and replaced with another aerial tool configuration (e.g., different configuration of attachments for an aerial tool configuration different than aerial tool assembly 300). To alter the capabilities of the apparatus as previously discussed and incorporate one or more water/chemical blasting rotating or non-rotating spray head(s) 1805. Each spray head 1805 may have one or more spray nozzles. Spray head 1805 may be powered by one or more independent water/chemical pump(s) and one or more quick connect/disconnect sealable supply hose(s) and/or line(s) couplings. A water/chemical blasting spray head may be further controlled by water/chemical flow and pressure via a water/chemical supply line attached to a water/chemical pump (not shown) and water/chemical supply tank 1810 (that may be similar to supply tank 1110 discussed previously). This example configuration may allow the operator to de-ice power lines aircraft, etc., clean or decontaminate equipment, components, pipe, rig equipment, storage and refining facilities, etc. Furthermore, if large volumes of water are required for a particular application supply tank 1810 may not be needed and a high volume water hose or line may be connected at the water pump intake to boost pressure.

In the foregoing description, for purposes of explanation, numerous specific details were set forth in order to provide a thorough understanding of the inventive concept. As part of this description, some structures and devices may be shown in block diagram form in order to avoid obscuring the invention. Moreover, the language used in this disclosure has been principally selected for readability and instructional purposes and may not have been selected to delineate or circumscribe the inventive subject matter, resort to the claims being necessary to determine such inventive subject matter. Reference in the specification to "one embodiment"

or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions may be made to achieve the designers' specific goals (e.g., compliance with system- and business-related constraints), and that these goals will vary from one implementation to another. It will also be appreciated that such development efforts might be complex and time-consuming but would nevertheless be a routine undertaking for those of ordinary skill in any field requiring design and implementation of boom mounted aerial tool apparatus having the benefit of this disclosure.

Various changes in the details of the illustrated operational methods and mechanical apparatuses are possible without departing from the scope of the following claims. For instance, illustrative embodiments of an aerial tool and boom actuator attachment assembly configuration (e.g., FIGS. 2-4) may be configured differently based on different aerial tool requirements and operating conditions. Alternatively, some embodiments may combine the configurations of multiple assemblies described herein as being separate options. Similarly, one or more of the described options may be omitted, depending upon the specific operational environment in which the device is being used.

The above disclosed apparatus may support various implementations and method for performing aerial commercial tasks. The following paragraphs list some example capabilities and methods that may be realized based on the above disclosure.

An aerial tool apparatus comprising: a transport vehicle; an aerial boom comprising one or more sections, having a boom axis, and attached at a proximate end of the aerial boom to the transport vehicle; an attachable and detachable aerial tool configured assembly comprising one or more tools as one or more configured attachments, a plurality of accessory ports, the plurality of accessory ports each associated with one or more quick connect disconnect sealable hose couplings; an actuator assembly connecting the attachable and detachable aerial tool configured assembly to a distal end of a most distal portion of the aerial boom thereby forming an aerial boom assembly, the aerial boom assembly further comprising an axial rotator for turning the aerial tool configured boom assembly in a plane perpendicular to the boom axis, the axial rotator comprising a rotating swivel, the rotating swivel further comprising a plurality of swivel ports, one or more of the plurality of swivel ports providing hydraulic or pneumatic power to at least one aerial tool accessory attached via the one or more quick connect/ disconnect sealable hose couplings, the actuator assembly further comprising one or more actuators configured to orient the attachable and detachable aerial tool configured boom assembly relative to the most distal portion of the aerial boom; and one or more powered aerial tool accessories connected to the attachable and detachable aerial tool configured assembly and to the quick connect/disconnect sealable hose couplings. The disclosed examples may be implemented wherein the one or more powered aerial tool accessories are controlled by pressure and flow rates as supplied by one or more hydraulic fluid channels thru the axial swivel and rotator via the quick connect/disconnect sealable hose couplings. The disclosed examples may be implemented wherein the one or more powered aerial tool accessories are separately attachable and detachable from the aerial tool configured assembly. The disclosed examples may be implemented wherein the aerial boom assembly is attachable and detachable from the boom attachment mechanism. The disclosed examples may be implemented wherein the quick connect/disconnect aerial tool configured assembly is capable of performing one or more independent tool application functions.

The disclosed examples may be implemented wherein there are at least two powered aerial tool configured accessories, the at least two powered aerial tool configured accessories comprising a trunk clamp/grapple mechanism with opposing clamping arms and a second rotator and chain saw. The disclosed examples may be implemented wherein the actuator assembly further comprises a second rotator configured to rotate the at least one aerial tool accessory in a plane parallel to the boom axis as adjusted by the actuator arm. The disclosed examples may be implemented wherein the one or more powered aerial tool configured assembly power configurations is selected from the power group consisting of: hydraulic, pneumatic or a non-hydraulic or pneumatic self-contained independent power source (e.g., electric, electric rechargeable battery pack, engine, or water/ chemical pump) or any combination thereof specific to the desired aerial tool configured assembly.

The disclosed examples may be implemented further comprising a configuration of hydraulic hoses, wherein the configuration of hydraulic hoses is selected from the group consisting of: hoses configured internal to the aerial boom, hoses configured external to the aerial boom, and hoses configured as a combination of internal and external to the aerial boom, and combination of hoses and hard lines external to the aerial boom. The disclosed examples may be implemented wherein there is a least one powered aerial tool configured accessory comprising a single circular saw blade with motor and rotator. The disclosed examples may be implemented wherein each aerial tool configuration is mechanically attachable and detachable to and from each other via a bolted, pinned, hinged, latching, coupling, interlocking, keyed or any other suitable mechanical connection device for the attaching and detaching of a complete one or more independently controlled aerial tool configured boom assembly. The disclosed examples may be implemented wherein there are at least one or more powered aerial tool configured accessories, the at least one or more powered aerial tool configured accessories comprising a limb shear with opposing cutting blades and limb clamp/grapple mechanism with opposing clamping arms. The disclosed examples may be implemented comprising an unmanned vehicle driven and operated by a wireless remote-control.

The disclosed examples may be implemented wherein the at least one independent powered aerial tool configured accessory comprising a wireless remote start and stop engine driven aerial tool accessory further comprising boom connecting actuators, connecting rod (pole), engine connected to a saw bar comprising one or more circular saw blades and controlled via operator cab or wireless remote control. The disclosed examples may be implemented wherein the at least one powered aerial tool configured accessory comprising a grapple mechanism with opposing clamping arms. The disclosed examples may be implemented wherein the at least one powered aerial tool configured accessory comprising a second rotator and saw bar arm comprising one or more circular saw blades. The disclosed examples may be implemented as operated by a wireless remote control. The disclosed examples may be implemented wherein the aerial boom includes a boom over-load sensing device. The disclosed examples may be implemented wherein the aerial boom includes an aerial boom camera. The disclosed examples may be implemented wherein the vehicle includes at least one or a combination of level sensing, vehicle GPS logging, mapping and tracking software devices. The disclosed examples may be implemented wherein the aerial tool configured accessory includes at least one or more rotational and /or mechanical actuators. The disclosed examples may be implemented wherein the aerial tool configured accessory includes at least one or more ported axial swivels with one or more connection ports. The disclosed examples may be implemented wherein the configured transport vehicle is selected from the group consisting of: a truck, trailer, truck or any mobile platform with rail road wheels or high rails, off road wheeled or track carrier, wheeled or track crawler, tractor, wheeled or track telehandler, wheeled or track crane, amphibious carrier, or any other suitable manned or unmanned mobile carrier to support and operate the aerial tool apparatus.

The disclosed examples may be implemented wherein the configured aerial boom may be constructed of fiberglass, steel, or any other suitable material or combination thereof and is further selected from the group consisting of: telescoping with one or more movable sections, multi-section over center knuckle, non over-center knuckle, or a combination knuckle and telescoping boom or any other suitable boom to support and operate the aerial tool apparatus for its intended purpose. The disclosed examples may be implemented as a method for using the above described apparatus for trimming trees, the method utilizing the capabilities identified in this disclosure based on identification of a work task; configuration of the apparatus to perform the work task; and performing the work task (e.g., cutting a limb using a clamping mechanism to prevent falling of the cut section).

An aerial tool apparatus comprising: a transport vehicle; an aerial boom comprising one or more sections, having a boom axis, and attached at a proximate end of the aerial boom to the transport vehicle; an attachable and detachable aerial tool configured assembly comprising one or more tools as one or more configured attachments, a plurality of accessory ports, the plurality of accessory ports each associated with one or more quick connect disconnect sealable hose couplings; an actuator assembly connecting the attachable and detachable aerial tool configured assembly to a distal end of a most distal portion of the aerial boom thereby forming an aerial boom assembly, the aerial boom assembly further comprising an axial rotator for turning the aerial tool configured boom assembly in a plane perpendicular to the boom axis, the axial rotator comprising a rotating swivel, the rotating swivel further comprising a plurality of swivel ports, one or more of the plurality of swivel ports providing hydraulic or pneumatic power to at least one aerial tool accessory attached via the one or more quick connect/disconnect sealable hose couplings, the actuator assembly further comprising one or more actuators configured to orient the attachable and detachable aerial tool configured boom assembly relative to the most distal portion of the aerial boom; and one or more powered aerial tool accessories connected to the attachable and detachable aerial tool configured assembly and to the quick connect/disconnect sealable hose couplings.

The disclosed examples may be implemented wherein the one or more powered aerial tool accessories are controlled by pressure and flow rates as supplied by one or more hydraulic fluid channels thru the axial swivel and rotator via the quick connect/disconnect sealable hose couplings. The disclosed examples may be implemented wherein the one or more powered aerial tool accessories are separately attachable and detachable from the aerial tool configured assembly. The disclosed examples may be implemented wherein the aerial boom assembly is attachable and detachable from the actuator assembly. The disclosed examples may be implemented wherein the quick connect/disconnect aerial tool configured assembly is capable of performing one or more independent tool application functions.

The disclosed examples may be implemented wherein there are at least one or more powered tool accessories, the at least one or more powered aerial tool configured accessories comprising a demolition shear with opposing cutting blades and a grapple mechanism with opposing clamping arms. The disclosed examples may be implemented wherein the actuator assembly further comprises a second rotator configured to rotate the at least one aerial tool accessory in a plane parallel to the boom axis as adjusted by the actuator arm.

The disclosed examples may be implemented wherein the at least one independent powered aerial tool configured accessory comprising one or more water/chemical blasting rotating or non-rotating spray head(s), with one or more spray nozzles, powered by one or more independent water/chemical pump(s) and one or more quick connect/disconnect sealable supply hose(s) and/or lines(s) couplings.

What is claimed is:

1. An aerial tool apparatus comprising:
    a transport vehicle;
    an aerial boom comprising:
        one or more connected sections and two ends of the aerial boom, including a proximate end boom section attached to the transport vehicle at a proximate end and a distal end boom section, the distal end boom section at a distal end from the transport vehicle,
        wherein two boom axes are defined relative to the distal end boom section, the two axes including a planar axis associated with a plane relative to the distal end boom section and a perpendicular axis perpendicular to the planar axis;
    an aerial tool assembly connected to the distal boom section via one or more attachment points, the aerial tool assembly comprising two or more aerial tool accessories that are independently operable,
        wherein the aerial tool assembly is field attachable and detachable from the distal end boom section or at least one of the two or more aerial tool accessories is field attachable and field detachable from the aerial tool assembly;
    a first axial rotator connecting the aerial tool assembly to the distal end boom section and configured to turn the aerial tool assembly relative to the perpendicular axis,
        wherein the first axial rotator comprises a first rotating swivel having a plurality of swivel ports, one or more of the plurality of swivel ports configured to provide hydraulic or pneumatic power to at least one of the two or more aerial tool accessories,
        wherein pressure and flow rates provided through respective ones of the plurality of swivel ports are controlled independently for different ones of the two or more aerial tool accessories that are independently operable,
        wherein the first axial rotator is configured to rotate the aerial tool assembly through 360 degrees in either direction for a plurality of complete rotations while maintaining fluid connectivity through the rotating swivel; and
one or more actuators for orienting the aerial tool assembly relative to the perpendicular boom axis, the one or more actuators controlled hydraulically.

2. The aerial tool apparatus of claim 1, wherein the first axial rotator is configured to rotate the aerial tool assembly allowing for continuous rotation in a selected direction.

3. The aerial tool apparatus of claim 1, wherein each of the two or more aerial tool accessories are independently field attachable and field detachable from the aerial tool assembly.

4. The aerial tool apparatus of claim 1, wherein the at least two aerial tool accessories are concurrently configured on the aerial tool assembly to be operated to perform together to complete a tree maintenance task.

5. The aerial tool apparatus of claim 1, wherein the aerial tool assembly that includes the at least two aerial tool accessories is detachable from the distal end boom section as a single configured unit.

6. The aerial tool apparatus of claim 1, wherein the aerial tool assembly is field attachable and detachable from the distal end of the boom via a click type connection.

7. The aerial tool apparatus of claim 1, wherein the at least two or more aerial tool accessories are controlled by pressure and flow rates as supplied by one or more fluid channels through the axial rotator and utilizing respective ones of the plurality of swivel ports.

8. The aerial tool apparatus of claim 7, wherein the one or more fluid channels allow for flow caused by pneumatic pressure.

9. The aerial tool apparatus of claim 7, wherein the one or more fluid channels allow for flow caused by hydraulic pressure.

10. The aerial tool apparatus of claim 1, wherein the one or more of the plurality of swivel ports configured to provide hydraulic or pneumatic power to at least one of the two or more aerial tool accessories utilize quick connect connect/disconnect sealable hose couplings to provide power via a respective one of the plurality of swivel ports.

11. The aerial tool apparatus of claim 1, wherein the two or more aerial tool accessories include a grapple and a cutting tool.

12. The aerial tool apparatus of claim 11, wherein the cutting tool is a saw.

13. The aerial tool apparatus of claim 11, wherein the cutting tool is a demolition shear.

14. The aerial tool apparatus of claim 1, wherein at least one of the two or more aerial tool accessories is operated using a wireless remote control.

15. A method of operating an aerial tool apparatus, the method comprising:
identifying at least a portion of an object to be severed from the object, the portion to be mechanically controlled after severance;
positioning a transport vehicle proximate to the object; and
mechanically grappling the portion;
wherein the transport vehicle comprises:
an aerial boom comprising:
one or more connected sections; and
two ends of the aerial boom including a proximate end attached to the transport vehicle and a distal end relative to the proximate end,
wherein two boom axes are defined relative to the distal end, the two axes including a planar axis associated with a plane relative to the distal end and a perpendicular axis perpendicular to the planar axis;
an aerial tool assembly comprising:
a plurality of attachment points to accept two or more independently operable aerial tool accessories to form a configured aerial tool assembly, wherein the configured aerial tool assembly or at least one of the two or more independently operable aerial tool accessories is field attachable and field detachable from the distal end;
one or more actuators connected to the aerial boom to orient the configured aerial tool assembly relative to the perpendicular boom axis; and
a first axial rotator comprising:
a connector to connect the aerial tool assembly to the distal end, the first axial rotator for turning the aerial tool assembly relative to the perpendicular boom axis; and
a first rotating swivel having a plurality of swivel ports, one or more of the plurality of swivel ports to provide hydraulic or pneumatic power to respective ones of the two or more independently operable aerial tool accessories, wherein pressure and flow rates provided through respective ones of the plurality of swivel ports are controlled independently for different ones of the two or more independently operable aerial tool accessories.

16. An aerial tool apparatus comprising:
a transport vehicle;
an articulable aerial boom having a proximate end boom section and a distal end boom section, the aerial boom attached to the transport vehicle at the proximate end boom section, and including the distal end boom section defining a planar axis associated with a plane relative to the distal end boom section and a perpendicular axis perpendicular to the planar axis;
an aerial tool assembly including a plurality of independently operable aerial tool accessories, wherein the aerial tool assembly is field attachable and field detachable from the distal end section or at least two of the aerial tool accessories are field attachable and field detachable from the aerial tool assembly;
a first axial rotator connecting the aerial tool assembly to the distal end section of the aerial boom and configured to rotate the aerial tool assembly through 360° relative to the perpendicular axis, the first axial rotator including:
a first rotating swivel defining a swivel port to provide hydraulic or pneumatic power to at least two of the independently operable aerial tool accessories during rotation of the aerial tool assembly; and
a hydraulically controlled actuator for orienting the aerial tool assembly relative to the perpendicular boom axis,
wherein pressure and flow rates provided through respective ones of the plurality of swivel ports are controlled independently for different ones of the at least two independently operable aerial tool accessories.

17. The aerial tool apparatus of claim 16, wherein the aerial tool assembly that includes the at least two independently operable aerial tool accessories is detachable from the distal end boom section as a single configured unit.

18. The aerial tool apparatus of claim 16, wherein the transport vehicle is a boom truck.

\* \* \* \* \*